US012763522B2

(12) United States Patent
Yang et al.

(10) Patent No.: US 12,763,522 B2
(45) Date of Patent: Oct. 13, 2026

(54) KIND OF SPECIAL STRUCTURE GOLD FINGER PCIe SAS GEN5 PLUG

(71) Applicant: Amphenol Commercial Products (Chengdu) Co., Ltd., Chengdu (CN)

(72) Inventors: Kui Yang, Chengdu (CN); Xiaodong Hu, Chengdu (CN); Yaohua Hou, Chengdu (CN); Lei Liao, Shenzhen (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 263 days.

(21) Appl. No.: 18/508,986

(22) Filed: Nov. 14, 2023

(65) Prior Publication Data

US 2024/0162663 A1 May 16, 2024

(30) Foreign Application Priority Data

Nov. 15, 2022 (CN) ........................ 202211429218.X
Nov. 15, 2022 (CN) ........................ 202223031303.9

(51) Int. Cl.
*H01R 13/6474* (2011.01)
*H01R 13/424* (2006.01)

(52) U.S. Cl.
CPC ....... *H01R 13/6474* (2013.01); *H01R 13/424* (2013.01)

(58) Field of Classification Search
CPC ......................... H01R 13/6474; H01R 13/424; H01R 13/422; H01R 13/6585
(Continued)

(56) References Cited

U.S. PATENT DOCUMENTS 6,312,288 B1 * 11/2001 Genz .................... H01R 9/2433 439/694
7,581,990 B2 9/2009 Kirk et al.
(Continued)

FOREIGN PATENT DOCUMENTS

CN 202585857 U 12/2012
CN 203205638 U 9/2013
(Continued)

OTHER PUBLICATIONS

U.S. Appl. No. 17/476,002, filed Sep. 15, 2021, Wang et al.
(Continued)

*Primary Examiner* — Tulsidas C Patel
*Assistant Examiner* — Thaslimur Rahman
(74) *Attorney, Agent, or Firm* — Wolf, Greenfield & Sacks, P.C.

(57) ABSTRACT

A connector for use with high-speed signals. The connector has a housing, which includes conductive elements held in a row by a housing. Each conductive element includes a thinner portion and a thicker portion. The conductive elements are configured to make contact with a mating component at the thicker portions. The thinner portions are closer to mating ends of respective conductive elements than respective thicker portions. The housing is configured to provide voids selectively disposed underneath the conductive elements. Such a configuration increases impedances for the conductive elements at locations that would otherwise have lower impedance and therefore reduces impedance variations along signal transmission paths. Such a configuration can also reduce stub size and therefore reduce insertion loss. Such a configuration meets signal integrity requirements in connectors designed for 64 Gbps and beyond, while conforming to a standard that constrains mating and mounting interfaces.

20 Claims, 15 Drawing Sheets

(58) Field of Classification Search
USPC ........................................................ 439/733.1
See application file for complete search history.

(56) References Cited

U.S. PATENT DOCUMENTS

| | | | | |
|---|---|---|---|---|
| 7,914,302 | B1 * | 3/2011 | Zhu | H01R 13/6474 439/79 |
| 8,462,502 | B2 | 6/2013 | Hirano et al. | |
| 8,585,440 | B2 | 11/2013 | Jiang et al. | |
| 8,657,627 | B2 | 2/2014 | McNamara et al. | |
| 8,702,451 | B2 | 4/2014 | Luo et al. | |
| 8,740,631 | B2 | 6/2014 | Chen | |
| 8,858,243 | B2 | 10/2014 | Luo et al. | |
| 9,077,118 | B2 | 7/2015 | Szu et al. | |
| 9,225,090 | B2 | 12/2015 | Chen | |
| 9,407,022 | B1 | 8/2016 | Wang | |
| 9,520,680 | B2 | 12/2016 | Hsu et al. | |
| 9,564,714 | B1 | 2/2017 | Wang et al. | |
| 9,831,605 | B2 | 11/2017 | Buck et al. | |
| 9,941,641 | B1 | 4/2018 | Jiang et al. | |
| 9,985,391 | B1 | 5/2018 | Wang | |
| 10,283,910 | B1 | 5/2019 | Chen et al. | |
| 10,411,376 | B1 | 9/2019 | Wang et al. | |
| 10,651,589 | B1 | 5/2020 | Wang et al. | |
| 10,763,608 | B1 | 9/2020 | Wang et al. | |
| 10,910,770 | B2 | 2/2021 | Winey | |
| 11,050,176 | B2 | 6/2021 | Yang et al. | |
| 11,251,554 | B1 | 2/2022 | Tan et al. | |
| 11,581,687 | B2 | 2/2023 | Wang et al. | |
| 11,894,628 | B2 | 2/2024 | Wang et al. | |
| 2012/0329297 | A1 * | 12/2012 | Belanger, Jr. | H01R 12/7064 439/78 |
| 2014/0004744 | A1 | 1/2014 | Hsu et al. | |
| 2014/0211389 | A1 | 7/2014 | Zhou et al. | |
| 2016/0164216 | A1 * | 6/2016 | Tan | H01R 12/71 439/631 |
| 2018/0090887 | A1 | 3/2018 | Little et al. | |
| 2018/0205181 | A1 | 7/2018 | Chen et al. | |
| 2019/0214753 | A1 | 7/2019 | Jiang et al. | |
| 2020/0028289 | A1 | 1/2020 | Dai et al. | |
| 2021/0044060 | A1 | 2/2021 | Wu et al. | |
| 2021/0075155 | A1 * | 3/2021 | Jung | H01R 24/60 |
| 2021/0234291 | A1 | 7/2021 | Zerebilov | |
| 2021/0399455 | A1 | 12/2021 | Wang et al. | |
| 2022/0077614 | A1 | 3/2022 | Tan et al. | |
| 2022/0302655 | A1 | 9/2022 | Wang et al. | |
| 2022/0360000 | A1 | 11/2022 | Tan et al. | |
| 2023/0042161 | A1 | 2/2023 | Winey | |
| 2023/0047671 | A1 | 2/2023 | Wang et al. | |
| 2023/0050934 | A1 | 2/2023 | Yin et al. | |
| 2023/0122686 | A1 | 4/2023 | Wang et al. | |
| 2023/0124724 | A1 | 4/2023 | Tan et al. | |
| 2023/0125645 | A1 | 4/2023 | Yin et al. | |
| 2023/0253722 | A1 | 8/2023 | Zerebilov | |
| 2023/0387634 | A1 | 11/2023 | Hou et al. | |

FOREIGN PATENT DOCUMENTS

| | | | |
|---|---|---|---|
| CN | 103515792 | A | 1/2014 |
| CN | 203850501 | U | 9/2014 |
| CN | 104283080 | A | 1/2015 |
| CN | 204376132 | U | 6/2015 |
| CN | 205016785 | U | 2/2016 |
| CN | 103887641 | B | 6/2016 |
| CN | 205944534 | U | 2/2017 |
| CN | 206962152 | U | 2/2018 |
| CN | 207116835 | U | 3/2018 |
| CN | 207517943 | U | 6/2018 |
| CN | 109004437 | A | 12/2018 |
| CN | 208284706 | U | 12/2018 |
| CN | 208433570 | U | 1/2019 |
| CN | 209675519 | U | 11/2019 |
| CN | 109659740 | B | 9/2020 |
| CN | 112103723 | A | 12/2020 |
| CN | 212380677 | U | 1/2021 |
| CN | 111769395 | B | 2/2022 |
| CN | 215816686 | U | 2/2022 |
| CN | 217691950 | U | 10/2022 |
| TW | I505580 | B | 10/2015 |
| TW | I509921 | B | 11/2015 |
| TW | M546036 | U | 7/2017 |
| TW | M563682 | U | 7/2018 |
| TW | M573906 | U | 2/2019 |
| TW | M584561 | U | 10/2019 |
| TW | M606366 | U | 1/2021 |
| TW | M618868 | U | 11/2021 |
| TW | M621514 | U | 12/2021 |

OTHER PUBLICATIONS

U.S. Appl. No. 17/848,851, filed Jun. 24, 2022, Yin et al.
U.S. Appl. No. 17/874,814, filed Jul. 27, 2022, Yin et al.
U.S. Appl. No. 18/076,066, filed Dec. 6, 2022, Wang et al.
U.S. Appl. No. 18/084,454, filed Dec. 19, 2022, Tan et al.
U.S. Appl. No. 18/097,778, filed Jan. 17, 2023, Cao et al.
U.S. Appl. No. 18/097,805, filed Jan. 17, 2023, Cao et al.
U.S. Appl. No. 18/240,401, filed Aug. 31, 2023, Yang et al.
U.S. Appl. No. 18/323,469, filed May 25, 2023, Hou et al.
U.S. Appl. No. 18/354,816, filed Jul. 19, 2023, He et al.
U.S. Appl. No. 18/448,239, filed Aug. 11, 2023, Yin et al.
[No Author Listed], SFF Committee SFF-8639 Specification for Multifunction 6X Unshielded Connector. Rev 2.1. Development. SNIA SFF TWG Technology Affiliate. May 26, 2017. 32 pages.
[No Author Listed], SFF-TA-1001 Specification for Universal x4 Link Definition for SFF-8639. Rev 1.1. SNIA Advance storage & information technology. May 28, 2018. 20 pages.
Cao et al., High Speed Electrical Connector, U.S. Appl. No. 18/097,778, filed Jan. 17, 2023.
Cao et al., High Speed Electrical Connector, U.S. Appl. No. 18/097,805, filed Jan. 17, 2023.
He et al., High Speed Electrical Connector, U.S. Appl. No. 18/354,816, filed Jul. 19, 2023.
Mason et al., SAS Standards and Technology Update. Storage Developer Conference (SDC). 2011. 46 pages. URL:https://www.snia.org/sites/default/orig/SDC2011/presentations/monday/HarryMason_SAS%20_Standards_Technology_Updater1.pdf [last accessed Jun. 2, 2022].
Yang et al., PSAS Receptacle Connector, PSAS Plug Connector And Interconnection System Therewith, U.S. Appl. No. 18/240,401, filed Aug. 31, 2023.
Yin et al., High Speed, High Performance Electrical Connector, U.S. Appl. No. 18/448,239, filed Aug. 11, 2023.

* cited by examiner

KIND OF SPECIAL STRUCTURE GOLD FINGER PCIe SAS GEN5 PLUG

CROSS-REFERENCE TO RELATED APPLICATIONS

This application claims priority to and the benefit of Chinese Patent Application Serial Nos. 202223031303.9 and 202211429218.X, both filed Nov. 15, 2022. The contents of these applications are incorporated herein by reference in their entirety.

TECHNICAL FIELD

The present disclosure relates generally to electrical interconnection system, such as those including electrical connectors, used to interconnect electronic assemblies.

BACKGROUND

Electrical connectors are used in many electronic systems. It is generally easier and more cost-effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

A known arrangement for joining several printed circuit boards is to have one printed circuit board serve as a backplane. A known backplane is a PCB onto which many connectors may be mounted. Conducting traces in the backplane may be electrically connected to signal conductors in the connectors so that signals may be routed between the connectors. Other printed circuit boards, called “daughterboards”, “daughtercards”, or “midboards”, may be connected through the backplane. For example, daughtercards may also have connectors mounted thereon. The connectors mounted on a daughtercard may be plugged into the connectors mounted on the backplane. In this way, signals may be routed among daughtercards through the connectors and the backplane. The daughtercards may be plugged into the backplane at a right angle. Each of the connectors used for these applications may therefore include a right angle bend and is often called “a right angle connector”.

Connectors may also be used in other configurations for interconnecting printed circuit boards. Sometimes, one or more printed circuit boards may be connected to another printed circuit board, called a “motherboard,” that is both populated with electronic components and interconnects the daughterboards. In such a configuration, the printed circuit boards connected to the motherboard may be called “daughterboards”. The daughterboards are often smaller than the motherboard and may sometimes be aligned to be parallel to the motherboard. Connectors used for this configuration are often called “stacking connectors” or “mezzanine connectors.”

In other systems, the daughterboards may be perpendicular to the motherboard. For example, this configuration is often used in computers in which the motherboard might have a processor and a bus configured to pass data between the processor and peripherals, such as a graphics processor or memory. Connectors may be mounted to the motherboard and connected to the bus. The peripherals may be implemented on daughtercards with connectors that mate with the connectors on the bus such that separately manufactured peripherals may be readily integrated into a computer made with the motherboard.

To enhance the availability of peripherals, the bus and the connectors used to physically connect peripherals via the bus may be standardized. In this way, there may be a large number of peripherals available from a multitude of manufacturers. All of those products, so long as they are compliant with the standard, may be used in a computer that has a bus compliant with the standard. Examples of such standards include serial ATA (SATA), serial attached SCSI (SAS), peripheral component interconnect express (PCIe), or SFF-8639, which are commonly used in computers. The standards have gone through multiple revisions, adapting to the higher performance expected from computers over time.

BRIEF SUMMARY

Aspects of the present disclosure relate to high-performance, high-speed electrical connectors.

Some embodiments relate to an electrical connector. The electrical connector may include a housing; and a plurality of conductive elements held by the housing, each of the plurality of conductive elements comprising a thicker portion and a thinner portion. For each of the plurality of conductive elements: the conductive element may be configured to make contact with a mating component at the thicker portion; and the thinner portion may be closer to a mating end of the conductive element than the thicker portion.

Optionally, the housing comprises a base portion extending in a longitudinal direction and a tongue portion extending from the base portion in a mating direction perpendicular to the longitudinal direction; and for each of the plurality of conductive elements, the thinner portion is disposed on the tongue portion and has a thickness less than a thickness of the thicker portion in a vertical direction perpendicular to the longitudinal direction and the mating direction.

Optionally, the tongue portion comprises a plurality of voids adjacent the thinner portions of the plurality of conductive elements so as to reduce impedance variations along signal transmission paths.

Optionally, the plurality of conductive elements are retained in the housing at their edges such that broadsides of the plurality of conductive elements are adjacent respective voids.

Optionally, the base portion of the housing comprises a plurality of channels each fixedly holding a respective conductive element of the plurality of conductive elements.

Optionally, for each of the plurality of conductive elements: the thicker portion comprises a portion disposed on the tongue portion of the housing; and the portion of the thicker portion disposed on the tongue portion of the housing has a length in the mating direction of at least 1.9 mm and less than 3.9 mm.

Optionally, the tongue portion of the housing comprises a plurality of platforms each having a raised surface; the thinner portions of the plurality of conductive elements are at least partially disposed on the raised surfaces of respective platforms of the plurality of platforms; the raised surface of each of the plurality of platforms comprises first and second portions separated by a first void; the thinner portion of a respective conductive element is at least partially disposed on the first and second portions of the raise surface; the raised surface of each of the plurality of platforms comprises a third portion separated from the first portion by a second void; and the thinner portion of a second respective conductive element is at least partially disposed on the first and third portions of the raised surface.

Optionally, the plurality of platforms are a first plurality of platforms; the tongue portion of the housing comprises a second plurality of platforms each having a raised surface; and the thicker portions of the plurality of conductive elements are at least partially disposed on the raised surfaces of respective platforms of the second plurality of platforms.

Optionally, the plurality of conductive elements are a first plurality of conductive elements; and the electrical connector comprises a second plurality of conductive elements each extending with a uniform thickness to a mating end of the conductive element.

Some embodiments relate to an electrical connector. The electrical connector may include a housing; and a plurality of conductive elements held by the housing, each of the plurality of conductive elements comprising a mating portion, a mounting portion, and an intermediate portion joining the mating end and the mounting tail. For each of the plurality of conductive elements: the mating portion may comprise a mating end, a contact portion, and a middle portion extending between the mating end and the contact portion; and at least a portion of the middle portion is thinner than the contact portion in a vertical direction.

Optionally, for each of the plurality of conductive elements: the mating portion further comprises a surface slanting in the vertical direction and joining the at least a portion of the middle portion.

Optionally, the housing comprises a base portion extending in a longitudinal direction and a tongue portion extending from the base portion in a mating direction perpendicular to the longitudinal direction; and the tongue portion of the housing comprises a plurality of voids each disposed behind the thinner portion of a respective conductive element of the plurality of conductive elements.

Optionally, for each of the plurality of conductive elements: the mating end comprises a surface slanting in the vertical direction.

Optionally, the electrical connector may include a member disposed in the housing and comprising a conductive plate and lossy material selectively disposed on the conductive plate, the member comprising a plurality of openings extending therethrough in the vertical direction. For each of the plurality of conductive elements: the at least a portion of the middle portion is disposed above a respective opening of the plurality of openings of the member.

Optionally, the plurality of conductive elements comprise pairs of signal conductors and ground conductor disposed between adjacent pairs of signal conductors; and the member comprises portions protruding toward the ground conductors.

Some embodiments relate to an electrical connector. The electrical connector may include a housing comprising a base portion extending in a longitudinal direction, a tongue portion extending from the base portion in a mating direction perpendicular to the longitudinal direction; and a plurality of conductive elements each comprising a first portion held in the base portion of the housing, a second portion extending from the first portion and held on the tongue portion, and a third portion extending from the first portion and out of the base portion of the housing. The tongue portion of the housing may comprise a plurality of voids; and each of the plurality of conductive elements may be retained by edges of the second portion of the conductive element over a respective void of the plurality of voids.

Optionally, for each of the plurality of conductive elements, the second portion comprises: a first subportion disposed over the respective void of the plurality of voids; and a second subportion thicker than the first subportion in a vertical direction perpendicular to the longitudinal direction and the mating direction.

Optionally, the tongue portion of the housing comprises a first plurality of platforms aligned in a first row and a second plurality of platforms aligned in a second row parallel to the first row; the first plurality of platforms comprise the plurality of voids; and each of the second plurality of platforms is aligned with a respective platform of the first plurality of platforms in the mating direction such that at least a portion of the second subportion of the second portion of a respective conductive element is disposed on the respective platform of the second plurality of platform.

Optionally, each of the first plurality of platforms comprises a first portion, a second portion separated from the first portion by a first void of the plurality of voids, and a third portion separated from the first portion by a second void of the plurality of voids; and for each of the first plurality of platforms, a pair of conductive elements of the plurality of conductive elements are retained by the edges of the second portions of the pair of conductive elements over the first void and the second void, respectively.

Optionally, the tongue portion of the housing comprises a second plurality of voids disposed underneath respective conductive elements of the plurality of conductive elements.

Some embodiments relate to an electrical connector. The electrical connector is configured to mate with a mating connector and comprises an insulative housing and a plurality of conductive elements held by the insulative housing. For each of the plurality of conductive elements: the conductive element comprises a thicker portion and a thinner portion extending from the thicker portion, the thinner portion is closer to a first end of the conductive element than the thicker portion; and the conductive element is configured to establish electrical contact with a mating conductive element of the mating connector at the thicker portion when the electrical connector is mated with the mating connector.

Optionally, the insulative housing comprises a base portion elongated in a longitudinal direction, and a tongue portion extending from the base portion along a mating direction perpendicular to the longitudinal direction, the thinner portion and a section of the thicker portion are disposed on the tongue portion and oriented in the mating direction, the thinner portion comprises a first broadside and a second broadside opposite to each other in a vertical direction perpendicular to the longitudinal direction and the mating direction, and the thicker portion comprises a third broadside and a fourth broadside opposite to each other in the vertical direction, the thickness of the thinner portion between the first broadside and the second broadside is less than the thickness of the thicker portion between the third broadside and the fourth broadside.

Optionally, the first broadside and the third broadside each face away from the tongue portion, and the second broadside and the fourth broadside each face towards the tongue portion, the first broadside is flush with the third broadside in the vertical direction.

Optionally, the second broadside of the thinner portion comprises a first portion and a second portion, the first portion is indented relative to the fourth broadside of the thicker portion in the vertical direction, the second portion extends obliquely in the vertical direction to connect the first portion and the fourth broadside.

Optionally, the thinner portion has a consistent first thickness between the first broadside and the first portion of the second broadside along the mating direction, the thicker portion has a consistent second thickness between the third broadside and the fourth broadside along the mating direction.

Optionally, the first thickness is in a range between 40% and 80% of the second thickness.

Optionally, the thicker portion has, along the mating direction, a length greater than or equal to 1.9 mm. In one of these embodiments, the length is less than or equal to 3.9 mm.

Optionally, the first end is disposed on the tongue portion, and the electrical connector is configured such that, when the electrical connector is mated with the mating connector, the mating conductive element slides from the first end onto the conductive element and along the thinner portion onto the thicker portion.

Optionally, a location where the conductive element establishes an electrical contact with the mating conductive element at the thicker portion is adjacent to a joint between the thinner portion and the thicker portion.

Optionally, the thinner portion extends from the first end, the first end comprises a fifth broadside and a sixth broadside opposite to each other in the vertical direction, the fifth broadside faces away from the tongue portion and the sixth broadside faces towards the tongue portion, the thickness of the first end between the fifth broadside and the sixth broadside is less than the first thickness of the thinner portion, the sixth broadside is flush with the first portion of the second broadside in the vertical direction, and the fifth broadside extends obliquely in the vertical direction to connect the first broadside.

Optionally, the thicker portion comprises a first subportion connecting the thinner portion, a second subportion extending to the base portion, and a third subportion connecting the first subportion and the second subportion, the first subportion has a first width in the longitudinal direction, the second subportion has a second width in the longitudinal direction, and the third subportion has a third width in the longitudinal direction, the first width is less than the second width, and the third width transitions from the first width to the second width.

Optionally, the first width of the first subportion is consistent along the mating direction, and the second width of the second subportion is consistent along the mating direction, the first width of the first subportion is equal to the width of the thinner portion in the longitudinal direction.

Optionally, the conductive element establishes the electrical contact with the mating conductive element on the third subportion.

Optionally, for each of the plurality of conductive elements: the tongue portion supports the thicker portion and the thinner portion of the conductive element, and comprises a void recessed into the tongue portion in the vertical direction below at least a portion of at least one of the thicker portion and the thinner portion.

Optionally, the void comprises a first void configured to be positioned below the thicker portion in correspondence with the location where the conductive element establishes the electrical contact with the mating conductive element at the thicker portion.

Optionally, for each of the plurality of conductive elements: the tongue portion comprises a first platform supporting the thinner portion, and a second platform supporting the thicker portion, the first platform and the second platform are aligned with each other in the mating direction and separated by the first void.

Optionally, the first platform comprises a first support portion and a second support portion separated by a second void in the longitudinal direction, the second broadside of the thinner portion faces towards the first platform and is supported by the first support portion and the second support portion, respectively, at edge portions opposite to each other along the longitudinal direction, such that the second broadside is partially disposed above the second void.

Optionally, in the mating direction, the second void is adjacent to the location where the conductive element establishes the electrical contact with the mating conductive element at the thicker portion.

Optionally, an edge of the thicker portion extends beyond the second platform in the longitudinal direction, and the void comprises a third void below the edge.

Optionally, the tongue portion comprises a plurality of first platforms arranged in a first row in the longitudinal direction, each of the plurality of first platforms is configured to support the thinner portion of a first corresponding conductive element of the plurality of conductive elements, wherein: the first platform comprises a first support portion and a second support portion separated from the first support portion by a first void in the longitudinal direction; and the second broadside of the thinner portion of the first corresponding conductive element faces towards the first platform and is supported by the first support portion and the second support portion respectively at edge portions opposite to each other along the longitudinal direction, such that the second broadside of the thinner portion of the first corresponding conductive element is partially disposed above the first void.

Optionally, the first platform is further configured to support the thinner portion of a second corresponding conductive element of the plurality of conductive elements, wherein: the first platform further comprises a third support portion separated from the first support portion by a second void in the longitudinal direction; and the second broadside of the thinner portion of the second corresponding conductive element faces towards the first platform and is supported by the first support portion and the third support portion respectively at edge portions opposite to each other along the longitudinal direction, such that the second broadside of the thinner portion of the second corresponding conductive element is partially disposed above the second void.

Optionally, the first platform further comprises a fourth support portion connecting the first support portion, the second support portion and the third support portion, the fourth support portion supports portions of the second broadsides of the first corresponding conductive element and the second corresponding conductive element.

Optionally, the first corresponding conductive element and the second corresponding conductive element are configured as a differential signal pair.

Optionally, the tongue portion further comprises a plurality of second platforms arranged in a second row in the longitudinal direction, the second row is parallel to the first row, and each of the plurality of second platforms is aligned with a corresponding one of the plurality of first platforms in the mating direction, such that the second platform supports the thicker portion of the first corresponding conductive element, the second platform is separated from the corresponding first platform by a third void in the mating direction, the third void is positioned below the thicker portion in correspondence with the location where the conductive element establishes the electrical contact with the mating conductive element at the thicker portion.

Optionally, the electrical connector further comprises a member disposed in the insulative housing and extending at least in the tongue portion, the member comprises a conductive plate, the conductive plate defines a plurality of first openings, each of the plurality of first openings extends through the conductive plate in the vertical direction, for each of the plurality of conductive elements, at least a portion of the thinner portion is disposed above a corresponding one of the plurality of first openings.

Optionally, the electrical connector further comprises a member disposed in the insulative housing, the member comprises a conductive plate and a lossy material disposed on the conductive plate, the plurality of conductive elements comprises signal terminals and ground terminals, the lossy material is configured to electrically couple at least two of the ground terminals together.

Optionally, the lossy material comprises at least two protrusions protruding from the conductive plate and extending towards the at least two ground terminals, each of the at least two protrusions forms a platform at the tongue portion to contact and support at least one of the thicker portion and the thinner portion of a corresponding one of the at least two ground terminals.

Optionally, for each of the signal terminals: the tongue portion supports the thicker portion and the thinner portion of the signal terminal, and comprises a void recessed into the tongue portion in the vertical direction below at least a portion of at least one of the thicker portion and the thinner portion, the signal terminals are separated from the member by the void.

Some embodiments relate to an electrical connector. The electrical connector is configured to mate with a mating connector and comprises: an insulative housing; and a plurality of conductive elements held by the insulative housing, each conductive element comprising a mating portion extending from a mating end of the conductive element, wherein: the mating portion comprises a thinner portion and a thicker portion extending from the thinner portion, the thinner portion is closer to the mating end than the thicker portion; and the mating portion is configured to establish an electrical contact with a mating conductive element of the mating connector at the thicker portion when the electrical connector is mated with the mating connector.

Optionally, the location where the conductive element establishes the electrical contact with the mated conductive element at the thicker portion is adjacent to a joint between the thinner portion and the thicker portion.

Optionally, the insulative housing comprises a base portion elongated in a longitudinal direction, and a tongue portion extending from the base portion in a mating direction perpendicular to the longitudinal direction, the mating portion is disposed on the tongue portion and oriented in the mating direction, the thinner portion comprises a first surface and a second surface opposite to each other in a vertical direction perpendicular to the longitudinal direction and the mating direction, and the thicker portion comprises a third surface and a fourth surface opposite to each other in the vertical direction, the thickness of the thinner portion between the first surface and the second surface is less than the thickness of the thicker portion between the third surface and the fourth surface.

Optionally, the first surface and the third surface each face away from the tongue portion, and the second surface and the fourth surface each face towards the tongue portion, and the first surface is flush with the third surface in the vertical direction.

Optionally, the second surface of the thinner portion comprises a first portion and a second portion, the first portion is indented relative to the fourth surface of the thicker portion in the vertical direction, the second portion extends obliquely in the vertical direction to connect the first portion and the fourth surface.

Optionally, the thinner portion has a consistent first thickness between the first surface and the first portion along the mating direction, the thicker portion has a consistent second thickness between the third surface and the fourth surface along the mating direction.

Optionally, the conductive element further comprises an intermediate portion held in the base portion, the thicker portion extends between the intermediate portion and the thinner portion along the mating direction, and the thicker portion has, along the mating direction, a length greater than or equal to 1.9 mm.

Optionally, the length of the thicker portion is less than or equal to 3.9 mm.

Optionally, the conductive element further comprises a mounting portion extending from the intermediate portion oppositely to the thicker portion and from a side of the base portion opposite to the tongue portion, the mounting portion defines a mounting end of the conductive element opposite to the mating end.

Optionally, the mating end comprises a fifth surface and a sixth surface opposite to each other in the vertical direction, the fifth surface faces away from the tongue portion and the sixth surface faces towards the tongue portion, the thickness of the mating end between the fifth surface and the sixth surface that is less than the first thickness of the thinner portion, the sixth surface is flush with the first portion of the second surface in the vertical direction, and the fifth surface extends obliquely in the vertical direction to connect the first surface.

Optionally, for each of the plurality of conductive elements: the tongue portion supports the thicker portion and the thinner portion of the conductive element, and comprises a void recessed into the tongue portion in the vertical direction below at least a portion of at least one of the thicker portion and the thinner portion.

Some embodiments relate to an electrical connector. The electrical connector comprises: an insulative housing comprising a base portion elongated in a longitudinal direction, and a tongue portion extending from the base portion in a mating direction perpendicular to the longitudinal direction; and a plurality of conductive elements held by the insulative housing, each conductive element comprising a mating portion disposed on the tongue portion; wherein the tongue portion comprises a void recessed into the tongue portion in a vertical direction perpendicular to the longitudinal direction and the mating direction below at least a portion of the mating portion.

Optionally, the mating portion of each of the plurality of conductive elements comprises a first portion comprising a first surface and a second surface opposite to each other in the vertical direction, the first surface faces away from the tongue portion and the second surface faces towards the tongue portion, the tongue portion further comprises a plurality of first platforms arranged in a first row in the longitudinal direction, each of the plurality of first platforms is configured to support the first section of the mating portion of a first corresponding conductive element of the plurality of conductive elements, wherein: the first platform comprises a first support portion and a second support portion separated from the first support portion by a first void in the longitudinal direction; and the second surface of the first section of the mating portion of the first corresponding conductive element faces towards the first platform and is supported by the first support portion and the second support portion respectively at edge portions opposite to each other along the longitudinal direction, such that the second surface is partially disposed above the first void.

Optionally, the first platform is further configured to support the first section of the mating portion of a second corresponding conductive element of the plurality of conductive elements, wherein: the first platform further comprises a third support portion separated from the first support portion by a second void in the longitudinal direction; and the second surface of the first section of the mating portion of the second corresponding conductive element faces towards the first platform and is supported by the first support portion and the third support portion respectively at edge portions opposite to each other along the longitudinal direction, such that the second surface of the second corresponding conductive element is partially disposed above the second void.

Optionally, the first platform further comprises a fourth support portion connecting the first support portion, the second support portion and the third support portion, the fourth support portion supports portions of the second surfaces of the first sections of the mating portions of the first corresponding conductive element and the second corresponding conductive element.

Optionally, the first corresponding conductive element and the second corresponding conductive element are configured as a differential signal pair.

Optionally, the mating portion of each of the plurality of conductive elements comprises a second portion, the second portion is closer to the base portion than the first portion; the tongue portion further comprises a plurality of second platforms arranged in a second row in the longitudinal direction, the second row is parallel to the first row, and each of the plurality of second platforms is aligned with a corresponding one of the plurality of first platforms in the mating direction, such that the second platform supports the second section of the mating portion of the first corresponding conductive element; and the second platform is separated from the corresponding one of the first platforms by a third void in the mating direction.

Optionally, the electrical connector is configured to mate with a mating connector, and the conductive element is configured to establish an electrical contact with a mating conductive element of the mating connector at the second section when the electrical connector is mated with the mating connector, the third void is positioned below the second section in correspondence with the location where the conductive element establishes the electrical contact with the mating conductive element at the second section.

Optionally, the second section comprises a third surface and a fourth surface opposite to each other in the vertical direction, the thickness of the first section between the first surface and the second surface is less than the thickness of the second section between the third surface and the fourth surface.

Optionally, the third surface faces away from the tongue portion and the fourth surface faces towards the tongue portion, the first surface is flush with the third surface in the vertical direction.

These techniques may be used alone or in any suitable combination. The foregoing summary is provided by way of illustration and is not intended to be limiting.

BRIEF DESCRIPTION OF DRAWINGS

The above and other aspects of the present application will be more thoroughly understood and appreciated below in conjunction with the appended drawings. It should be noted that the appended drawings may be schematic and may not be drawn to scale. In the drawings, each identical or nearly identical component that is illustrated in various figures may be represented by a like numeral. For purposes of clarity, not every component may be labeled in every drawing. In the drawings.

LIST OF REFERENCE NUMBERS

Figure 1:
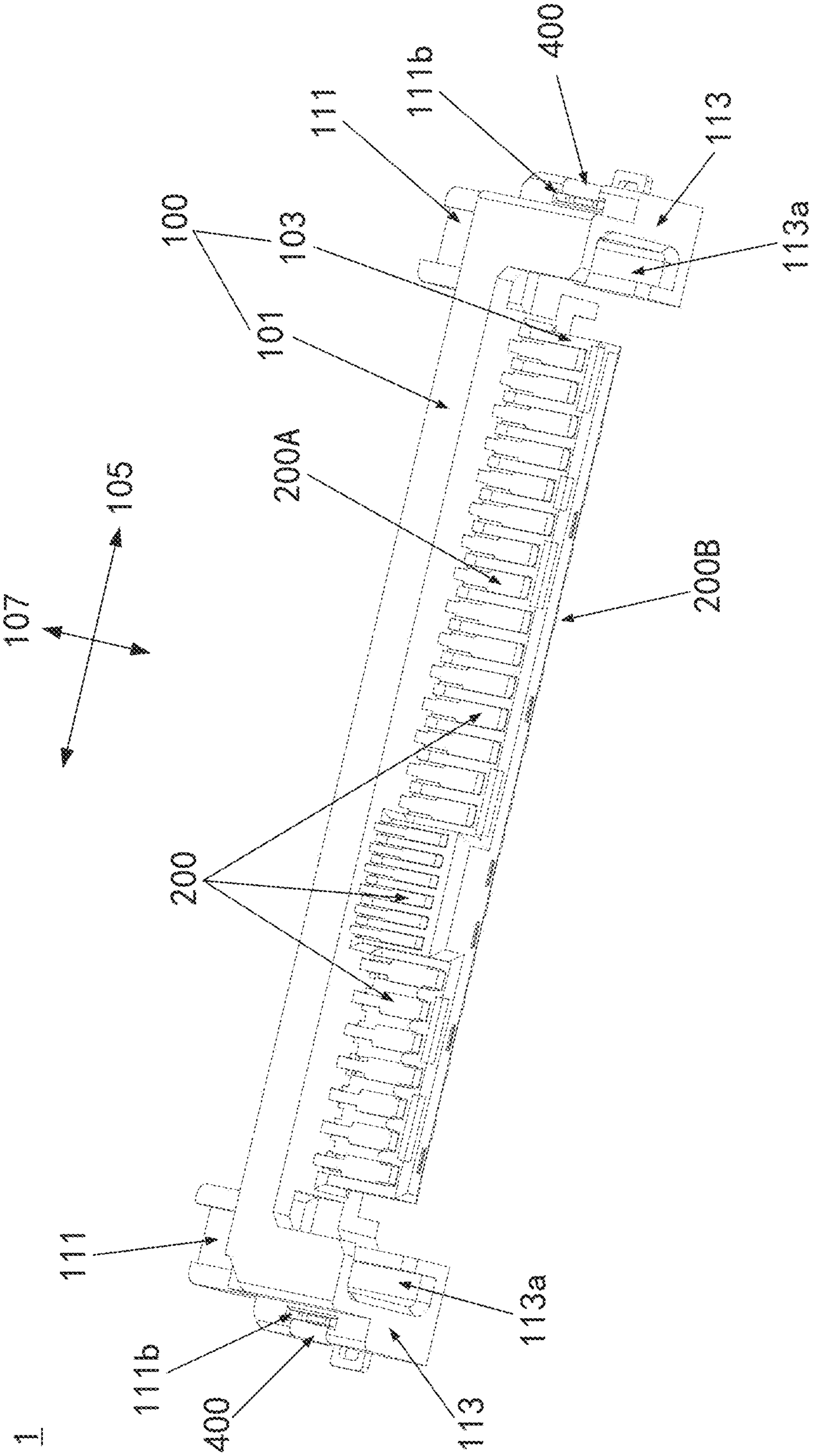
FIG. 1 is a top, front perspective view of an electrical connector, according to some embodiments.

1 electrical connector
3 mating conductive element
100 insulative housing
101 base portion
103 tongue portion
103*a* first platform
1031*a* first support portion
1032*a* second support portion
1033*a* third support portion
1034*a* fourth support portion
103*b* second platform
105 longitudinal direction
107 mating direction
109 vertical direction
111 rear portion
111*b* mount holder receiver
113 front portion
113*a* guiding slot
200 conductive element
200A top row of conductive elements
200B bottom row of conductive elements
201 mating end
201*a* fifth surface
201*b* sixth surface
203 mounting end
205 mating portion
207 intermediate portion
209 mounting portion
211 thinner portion
211*a* first surface
211*b* second surface
2111*b* first portion
2112*b* second portion
213 thicker portion
213*a* third surface
213*b* fourth surface
2001 first corresponding conductive element
2001*a*, 2001*b* edge portion
2002 second corresponding conductive element
2002*a*, 2002*b* edge portion
2003 ground terminal
2131 first subportion
2132 second subportion
2133 third subportion
300 member
301 conductive plate
301*a* conductive plate portion
301*b* conductive plate portion
301*c* conductive plate portion
302 first surface
303 lossy material
303*a* lossy material portion
303*b* lossy material portion
303*c* lossy material portion
304 second surface
305 first opening
307*a*, 307*b* protrusion
309 second opening
400 board holder.

DETAILED DESCRIPTION

The inventors have recognized and appreciated connector design techniques that satisfy the electrical and mechanical requirements to support greater bandwidth through high frequency operation. Some of these techniques can synergistically support higher frequency connector operation and satisfy the physical requirements set by industry standards such as PCIeSAS. Connectors that meet the mechanical requirements of the PCIeSAS specification with the performance required by GEN 5 and beyond are used as examples of connectors that apply these technologies.

Electrical connectors can have one or more rows of conductive elements. Some of the conductive elements in a row may be used as high-speed signal conductors. Optionally, some of the conductive elements may be used as low-speed signal conductors or power conductors. Some of the low-speed signal conductors and/or power conductors may also be designated as ground, referencing the signals being carried on the signal conductors or providing a return path for those signals. It should be appreciated that the ground conductors need not to be connected to earth ground, but may carry reference potentials, which may include earth ground, DC voltages or other suitable reference potentials.

At least some of the conductive elements, such as high-speed signal conductors, may have thinner portions and thicker portions. These conductive elements may be configured to establish contact with a mating component, such as a receptacle connector, at the thicker portion to provide sufficient mechanical strength. Before arriving at the designated contact portions, conductive elements of the mating component may wipe along the thinner portions of respective conductive elements. Having the thinner portions can increase impedance for the conductive elements at the mating portions, which would otherwise have lower impedance than other portions of the conductive element. Such a configuration can therefore reduce the impedance variations along the signal transmission paths, thereby reducing cross-talk and improving signal integrity. Having the thinner portions can also reduce the stub size of the conductive element, thereby reducing insertion loss and improving signal integrity.

Alternatively or additionally, a housing of the electrical connector may be configured to reduce impedance variations along the signal transmission paths by providing voids underneath multiple portions of the conductive element. The conductive elements may be retained in the housing at their edges such that broadsides of the conductive elements are adjacent the voids in the housing. The housing may nonetheless provide sufficient mechanical support for the conductive elements, including conductive elements with thinner portions. The housing may be configured, for example, to reduce the risks of the conductive elements with thinner portions being lifted by the conductive elements of the mating component. The housing may have platforms configured for supporting the thinner portions of the conductive elements. The platforms may have voids such that the thinner portions of the conductive elements may be at least partially disposed on respective voids so as to reduce contact area between the conductive elements and respective platforms, which may reduce impedance variation and prevent the conductive elements with thinner portions from being lifted. The thinner portion of each conductive element may be supported by portions of a respective platform on opposite sides of the void so as to have sufficient mechanical support for the conductive element.

The housing may further have platforms configured to support the thicker portions of the conductive elements. These platforms may be disposed opposite to the platforms configured to support thinner portions of the conductive element so as to coordinate with each other to reduce impedance variations along signal transmission paths and provide sufficient mechanical support for the conductive elements. Such a configuration may reduce crosstalk and loss, thereby improving signal integrity.

Some embodiments of the present application are described in detail below in conjunction with the accompanying drawings.

FIGS. 1 to 17C illustrate an electrical connector 1 according to some embodiments of the present application. The electrical connector 1 may be configured to mate with a mating connector. The electrical connector 1 may, for example, be configured as a plug connector (e.g., a U.2 type plug connector) to be combined with a mating receptacle connector (not shown) to form an electrical connector assembly. Such an electrical connector assembly can provide an industry-standard interface such as SFF-8639 to establish an electrical connection between a storage drive (such as a hard disk drive (HDD), a solid state drive (SSD), an optical disk drive (ODD)) and a circuit board (such as a backplane, a midplane, a drive carrier board). The electrical connector 1 may be configured to be mounted to the circuit board, and the receptacle connector may be configured to connect the storage drive to the electrical connector 1, whereby the electrical connector 1 can establish an electrical connection between the circuit board and the receptacle connector, and the receptacle connector can establish an electrical connection between the storage drive and the electrical connector 1. In this way, the electrical connector assembly of the electrical connector 1 and the receptacle connector may establish an electrical connection between the storage driver and the circuit board, thereby enabling signal and/or power transfer. Such an electrical connector assembly may be referred to as a "storage drive connector."

As shown in the examples illustrated in FIGS. 1 to 13, the electrical connector 1 includes an insulative housing 100. The insulative housing 100 includes a base portion 101 and a tongue portion 103 extending from the base portion 101. The base portion 101 is elongated in a longitudinal direction 105. The tongue portion 103 extends from the base portion 101 in a mating direction 107 perpendicular to the longitudinal direction 105 and is configured to be inserted into a receptacle connector (not shown) that mates with the electrical connector 1. The electrical connector 1 is configured to mate with the mating connector along the mating direction 107. The base portion 101 is integral with the tongue portion 103.

The insulative housing 100 may be formed by any suitable manufacturing process in the art such as injection molding. The insulative housing 100 may be formed of an insulative material. Examples of insulative materials that are suitable for forming the insulative housing 100 include, but are not limited to, plastic, nylon, liquid crystal polymer (LCP), polyphenyline sulfide (PPS), high temperature nylon or polyphenylenoxide (PPO) or polypropylene (PP).

As shown in FIGS. 1 to 9, the electrical connector 1 further includes a plurality of conductive elements 200 held by the insulative housing 100. In some embodiments, as shown in the figures, the plurality of conductive elements 200 may be held by the insulative housing 100 in two rows, e.g., a top row of conductive elements (e.g., first row) 200A and a bottom row of conductive elements (e.g., second row) 200B. It should be appreciated that the present application may not be limited thereto. In some embodiments, the electrical connector 1 may have only one row of conductive elements or more than two rows of conductive elements.

Each of the plurality of conductive elements 200 is formed of a conductive material. The conductive material suitable for forming the conductive elements 200 may be a metal or a metal alloy, such as a copper or copper alloy.

Figure 16B:
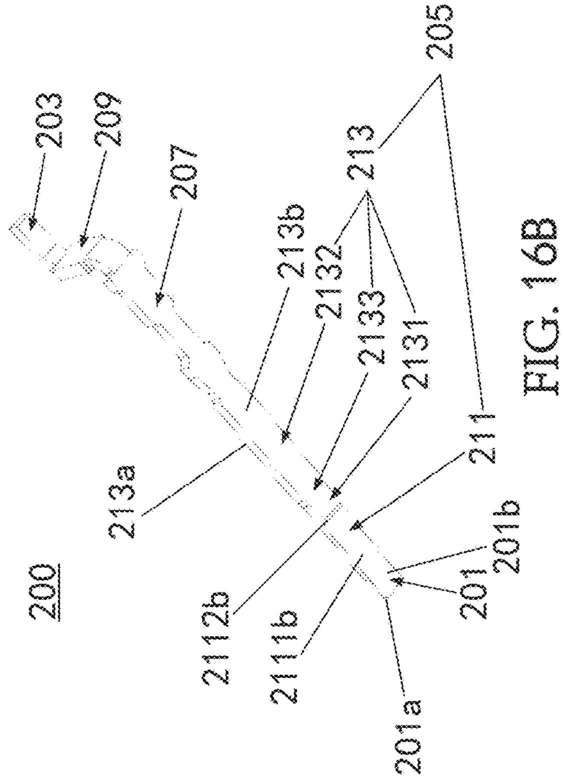
FIGS. 16A and 16B are top and bottom perspective views of a conductive element of the bottom row of conductive elements of the electrical connector of FIG. 1, respectively.
Figure 16D:
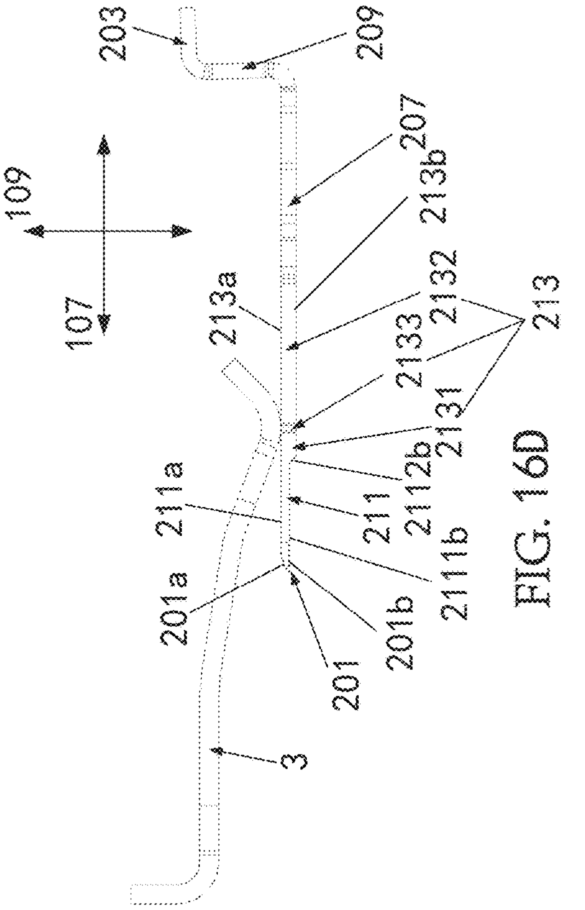
FIG. 16D is a side view of the conductive elements of FIG. 16C.
Figure 16A:
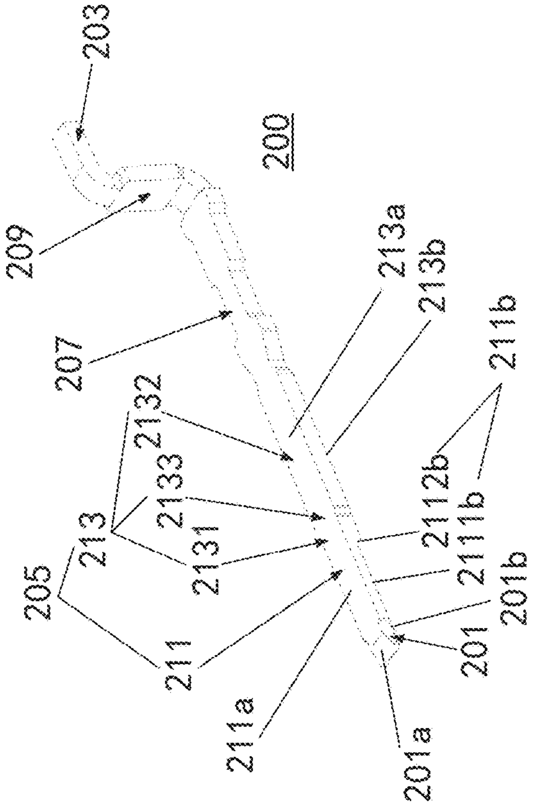

In some embodiments, as shown in FIGS. 16A and 16B, each conductive element 200 may include a mating end (e.g., first end) 201 and a mounting end (e.g., second end) 203 that are opposite to each other, and a mating portion 205, an intermediate portion 207, and a mounting portion 209, which extend between the mating end 201 and the mounting end 203. The mating portion 205 may be adjacent to the mating end 201. For example, the mating portion 205 may extend from the mating end 201. The mounting portion 209 may be adjacent to the mounting end 203. For example, the mounting portion 209 may extend from the mounting end 203. The intermediate portion 207 may extend between the mating portion 205 and the mounting portion 209 and connect the mating portion 205 to the mounting portion 209. The mounting end 203 may be defined by the mounting portion 209. It should be appreciated that the present application may not be limited thereto. For example, there may be another portion(s) between the mating portion 205 and the mating end 201, and/or there may be another portion(s) between the mounting portion 209 and the mounting end 203.

Figure 2:
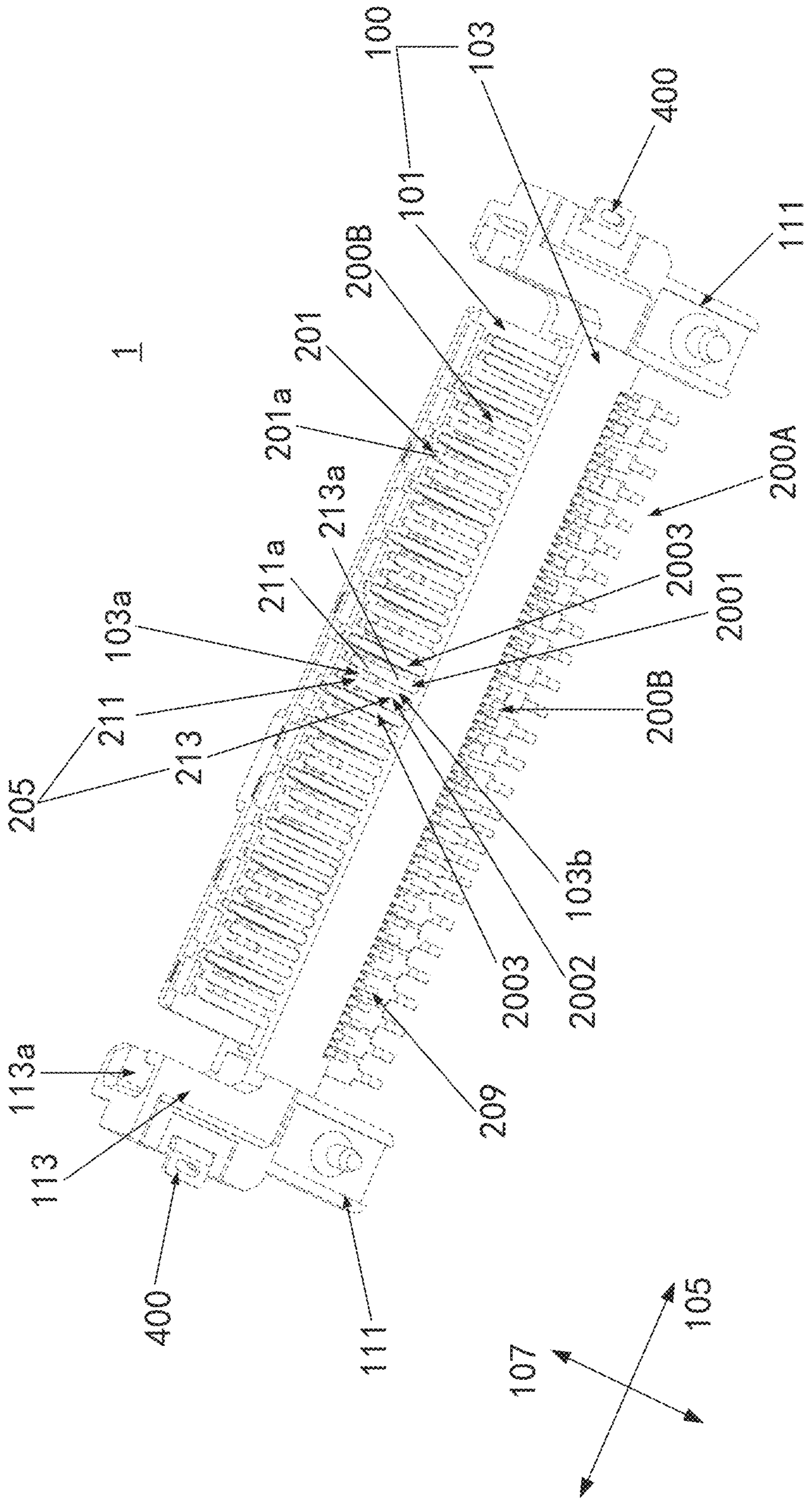
FIG. 2 is a bottom, front perspective view of the electrical connector of FIG. 1.
Figure 3:
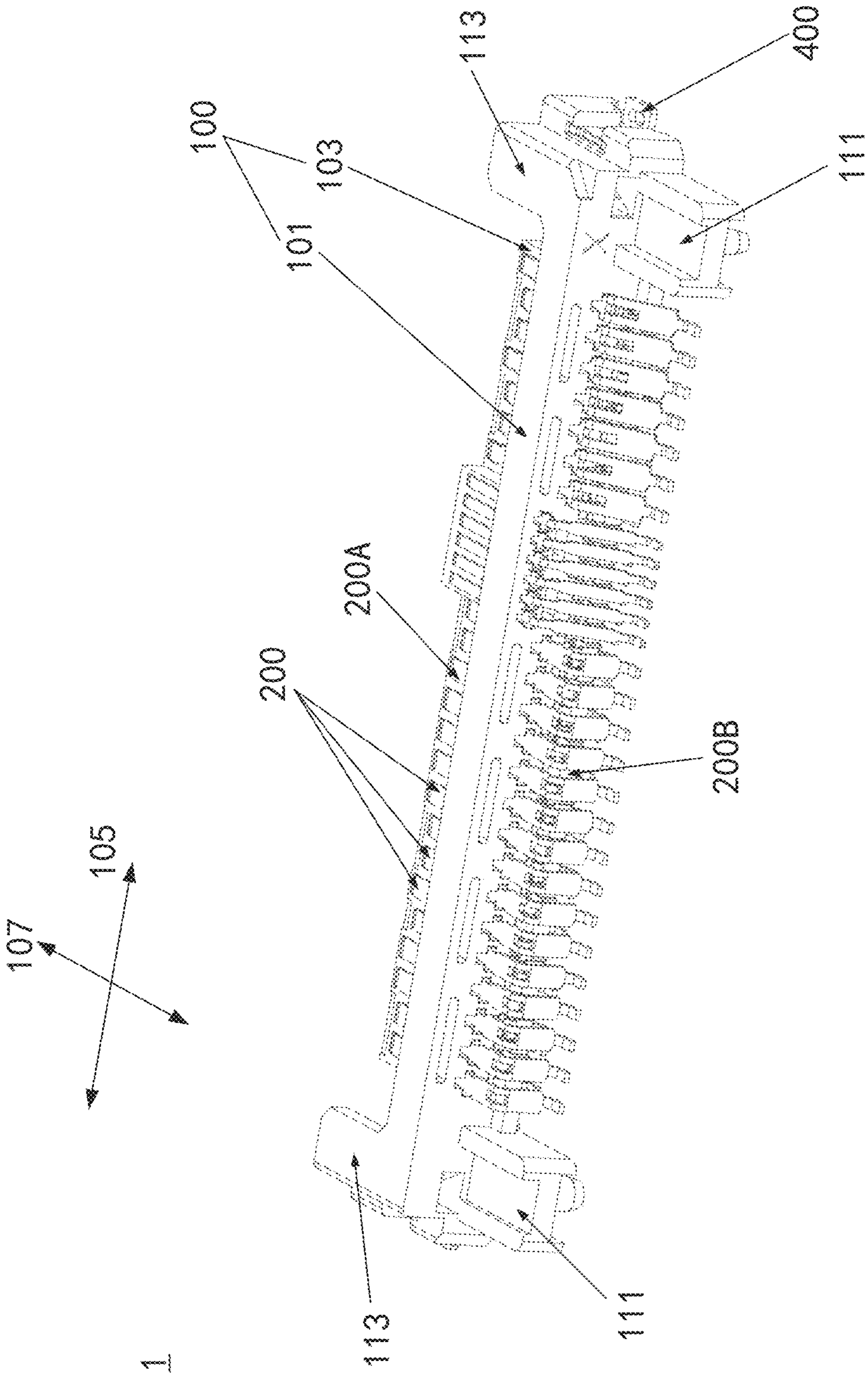
FIG. 3 is top, rear perspective view of the electrical connector of FIG. 1.

The conductive elements 200 of each of the top row (e.g., first row) of conductive elements 200A and the bottom row (e.g., second row) of conductive elements 200B may be aligned along the longitudinal direction 105. The mating portions 205 of the conductive elements 200 of the top row (e.g., first row) of conductive elements 200A and the bottom row of conductive elements 200B may be disposed on the tongue portion 103 of the insulative housing 100 and oriented along the mating direction 107. As shown in FIGS. 1 and 2, the mating portions 205 of the conductive elements of the top row (e.g., first row) of conductive elements 200A and the bottom row (e.g., second row) of conductive elements 200B may be disposed on the tongue portion 103 at opposite sides of the tongue portion 103 in a vertical direction 109 perpendicular to the longitudinal direction 105 and the mating direction 107, respectively, and each oriented along the mating direction 107. As will be described in detail below, the mating portion 205 may be configured to establish an electrical connection with a corresponding mating element (e.g., the exemplary corresponding mating element 3 shown in FIGS. 14 to 15 and 16C to 16D) of a mating connector (e.g., a receptacle connector).

In some embodiments, the intermediate portion 207 of the conductive element 200 may be retained in the base portion 101. As shown in the illustrated example, the base portion 101 may include a plurality of channels each fixedly holding at least a portion of the intermediate portion 207 of a respective conductive element 200. In some embodiments, the mounting portion 209 of the conductive element 200 may be configured to be mounted to a circuit board, and specifically attached to a conductive trace or other conductive structure on the circuit board, by utilizing any suitable technique such as a surface mount technology (SMT) and a pin in solder paste method (PiP). It should be appreciated that the present application may not be limited thereto.

An exemplary conductive element 200 that may be used in the electrical connector 1 of the present application is described below in connection with FIGS. 8 to 8A and 16A to 16D. For example, the conductive element 200 may be a conductive element of the bottom row of conductive elements 200B. It should be appreciated that the conductive element 200 may also be a conductive element of the top row of conductive elements 200A.

Figure 8:
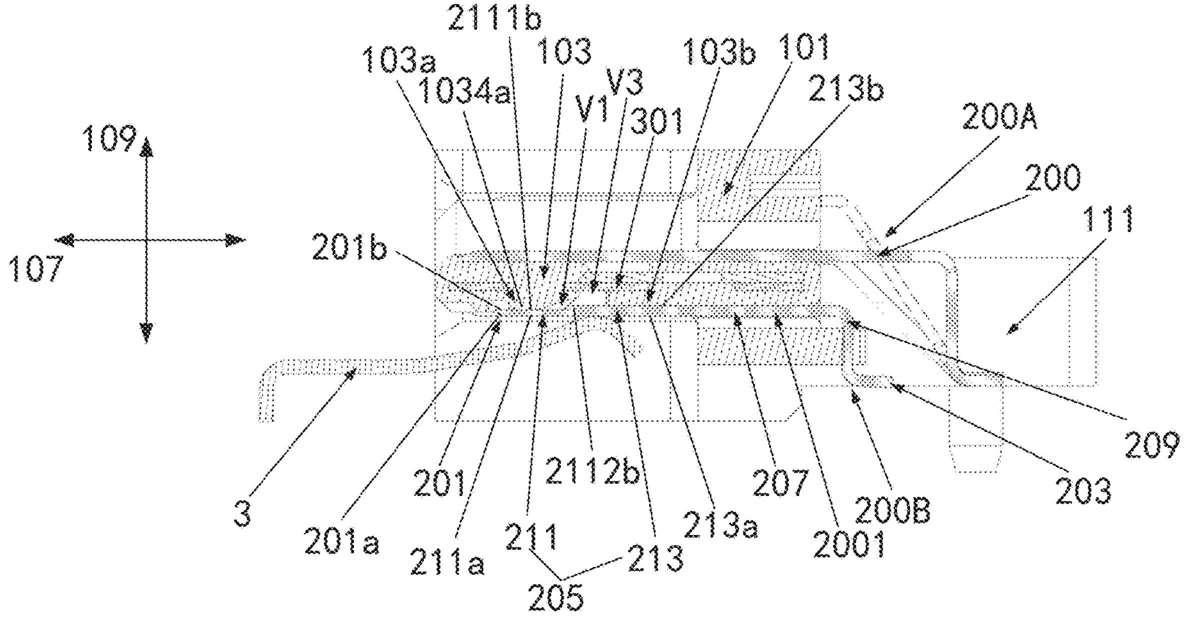
FIG. 8 is a cross-sectional view of the electrical connector of FIG. 1 taken along line I-I in FIG. 5, also illustrating an exemplary mating conductive element of an exemplary mating connector mated with a conductive element of the electrical connector.

In some embodiments, as shown in FIGS. 8 and 16A to 16D, the conductive element 200 includes a mating portion 205 extending from the mating end 201. As illustrated in FIG. 8, the mating portion 205 is configured to be disposed on the tongue portion 103 of the insulative housing 100 and oriented in the mating direction 107. The mating portion 205 includes a thinner (e.g., first) portion 211 and a thicker (e.g., second) portion 213 extending from the thinner portion 211. As used herein, "thinner" and "thicker" may refer to thicknesses of these portions relative to each other and may not be limited to absolute values. As illustrated, the thinner portion 211 is closer to the mating end 201 than the thicker portion 213.

FIGS. 8 to 8A and 16C to 16D schematically depict that the mated state of the conductive element 200 of the electrical connector 1 with the corresponding mating element 3 of the mating connector when the electrical connector 1 is mated with the mating connector. As shown, when the electrical connector 1 is mated with the mating connector, the mating portion 205 of the conductive element 200 establishes an electrical contact with the mating conductive element 3 of the mating connector at the thicker portion 213. For example, the mating conductive element 3 may be elastically pressed against the thicker portion 213 of the mating portion 205 of the conductive element 200. In some embodiments, when the electrical connector 1 is mated with the mating connector, the mating conductive element 3 of the mating connector may slide from the mating end 201 onto the mating portion 205 of the conductive element 200 of the electrical connector 1 and along the thinner portion 211 onto the thicker portion 213.

Configuring the conductive element 200 to establish an electrical contact with the mating conductive element 3 of the mating connector at the thicker portion 213 can provide sufficient mechanical strength. The fact of the mating portion 205 having the thinner portion 211 may increase the impedance of the conductive element 200 at the mating portion, which would otherwise have lower impedance than other portions of the conductive element 200 (for example, the intermediate portion 207 and the mounting portion 209). Such a configuration may therefore reduce impedance variations along signal transmission paths, thereby reducing crosstalk and improving signal integrity. In addition, having the thinner portions 211 may also reduce stub sizes for the conductive elements 200 and therefore reduce insertion loss and improve signal integrity.

Figure 16C:
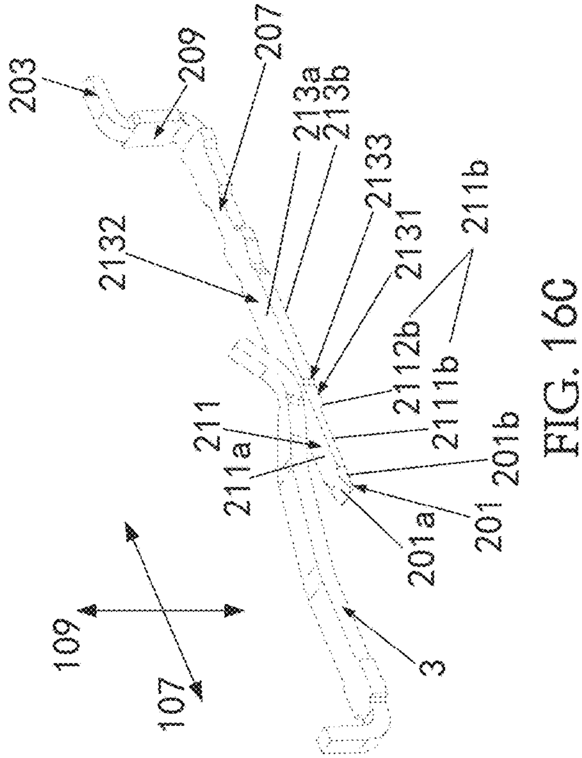
FIG. 16C is a perspective view of the conductive element of FIG. 16A mated with an exemplary mating conductive element of an exemplary mating connector.

In some embodiments, as shown in FIGS. 8 and 16C to 16D, location the conductive element 200 may establish the electrical contact with the mating conductive element 3 at the thicker portion 213 at a location adjacent to the joint between the thinner portion 211 and the thicker portion 213.

The thinner portion 211 of the mating portion 205 of the conductive element 200 includes a first surface 211*a* and a second surface 211*b* opposite to each other in the vertical direction 109 perpendicular to the longitudinal direction 105 and the mating direction 107. The first surface 211*a* and the second surface 211*b* may be two broadsides of the thinner portion 211. The thinner portion 211 also includes side edges opposite to each other in the longitudinal direction 105 and respectively connecting the first surface 211*a* and the second surface 211*b*. The thicker portion 213 of the mating portion 205 includes a third surface 213*a* and a fourth surface 213*b* opposite to each other in the vertical direction 109. The third surface 213*a* and the fourth surface 213*b* may be two broadsides of the thicker portion 213. The thinner portion 211 also includes side edges opposite to each other in the longitudinal direction 105 and respectively connecting the third surface 213*a* and the fourth surface 213*b*. The thickness of the thinner portion 211 between the first surface 211*a* and the second surface 211*b* is less than the thickness of the thicker portion 213 between the third surface 213*a* and the fourth surface 213*b*.

Figure 8A:
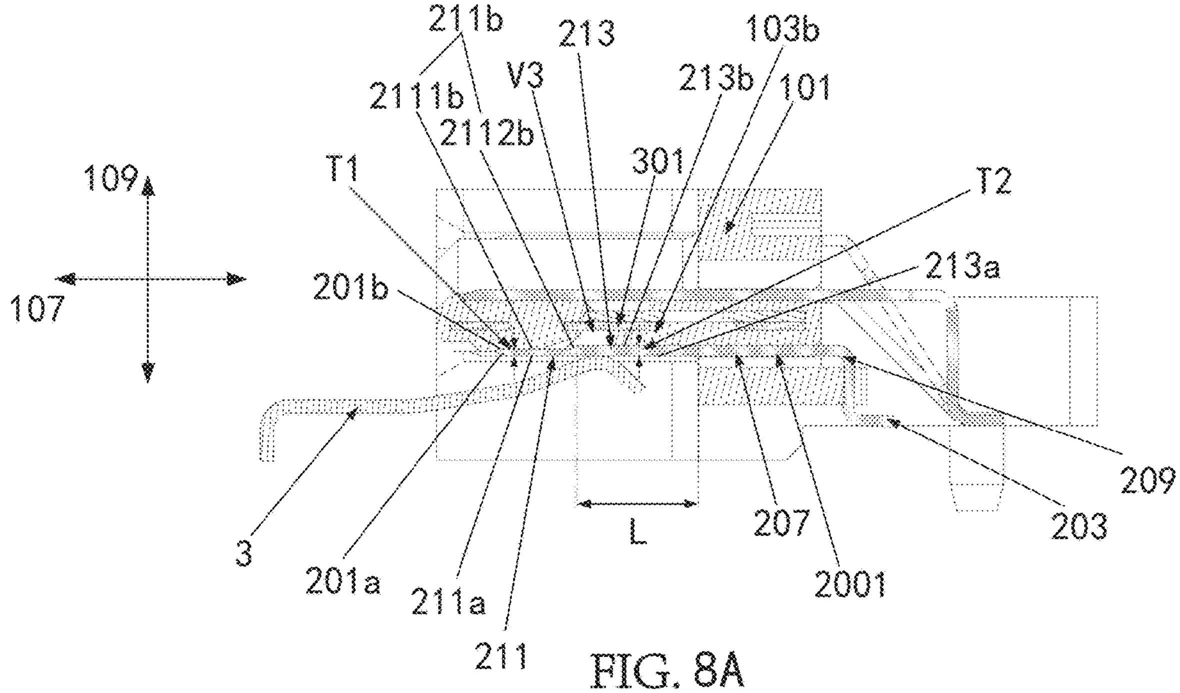
FIG. 8A is a cross-sectional view of FIG. 8, with additional markings for the thinner portion and thicker portion of the mating portion of the conductive element shown in FIG. 8.

The first surface 211*a* of the thinner portion 211 and the third surface 213*a* of the thicker portion 213 each face away from the tongue portion 103, and the second surface 211*b* of the thinner portion 211 and the fourth surface 213*b* of the thicker portion 213 each face towards the tongue portion 103. In some embodiments, as shown in FIGS. 8 to 8A and 16A to 16D, the first surface 211*a* may be flush with the third surface 213*a* in the vertical direction 109. In one of these embodiments, as shown in FIGS. 8 to 8A and 16A to 16D, the second surface 211*b* of the thinner portion 211 may include a first portion 2111*b* and a second portion 2112*b*. The first portion 2111*b* is indented in the vertical direction 109 relative to the fourth surface 213*b* of the thicker portion 213, e.g., the first portion 2111*b* is recessed into the thinner portion 211 relative to the fourth surface 213*b* of the thicker portion 213. The second portion 2112*b* extends obliquely in the vertical direction 109 to connect the first portion 2111*b* with the fourth surface 213*b* of the thicker portion 213. In one of these embodiments, as shown in FIGS. 8 and 8A, the thinner portion 211 has a consistent first thickness T1 (FIG. 8A) between the first surface 211*a* and the first portion 2111*b* along the mating direction 107, and the thicker portion 213 has a consistent second thickness T2 (FIG. 8A) between the third surface 213*a* and the fourth surface 213*b* along the mating direction 107. For example, the first thickness T1 may be in the range of 1% to 99%, 10% to 90%, 20% to 80%, 40% to 80%, 30% to 70%, 40% to 60%, 45% to 55%, or 50% of the second thickness T2 or in any other suitable range of the second thickness T2. The first thickness T1 may be between 0.01 mm and 0.25 mm. The thickness of the thinner portion 211 between the first surface 211*a* and the second portion 2112*b* may transition from the first thickness to the second thickness. For example, the thickness of the thinner portion 211 between the first surface 211*a* and the second portion 2112*b* may transition linearly from the first thickness T1 to the second thickness T2.

As illustrated in FIGS. 8 and 8A, the intermediate portion 207 of the conductive element 200 is retained in the base portion 101 of the insulative housing 100. The thicker portion 213 extends between the intermediate portion 207 and the thinner portion 211 along the mating direction 107. In some embodiments, the length L (FIG. 8A) of the thicker portion 213 along the mating direction 107 may be greater than or equal to 1.9 mm. In one of these embodiments, the length L of the thicker portion 213 along the mating direction 107 may be less than or equal to 3.9 mm. For example, the length L may be 1.9 mm, 2 mm, 2.5 mm, 3 mm, 3.5 mm, 3.9 mm, or may have any other suitable value.

As illustrated in FIGS. 8 and 8A, the mounting portion 209 of the conductive element 200 extends from the intermediate portion 207 oppositely to the thicker portion 213, and extends from the side of the base portion 101 opposite to the tongue portion 103. The mounting end 203 may be defined by the mounting portion 209. It should be appreciated that the intermediate portion 207 and the mounting portion 209 of the conductive element 200 may have a thickness consistent with that of the thicker portion 213 of the mating portion 205.

In some embodiments, as shown in FIGS. 16A to 16D, the thicker portion 213 includes a first subportion 2131 connecting with the thinner portion 211, a second subportion 2132 extending to the base portion 101 to connect with the intermediate portion 207, and a third subportion 2133 connecting the first subportion 2131 and the second subportion 2132. The first subportion 2131 has a first width in the longitudinal direction 105 (e.g., between the two opposite side edges), the second subportion 2132 has a second width in the longitudinal direction 105 (e.g., between the two opposite side edges), and the third subportion 2133 has a third width in the longitudinal direction 105 (e.g., between the two opposite side edges). The first width is less than the second width, and the third width transitions from the first width to the second width. For example, the thicker portion 213 widens from the first subportion 2131 to the second subportion 2132. In one of these embodiments, this third width may transition linearly from the first width to the second width. In one of these embodiments, the first width of the first subportion 2131 is consistent along the mating direction 107, and the second width of the second subportion 2132 is consistent along the mating direction 107. The first width of the first subportion 2131 of the thicker portion 213 may be equal to the width of the thinner portion 211 in the longitudinal direction 105. In one of these embodiments, the conductive element 200 may establish an electrical contact with the mating conductive element 3 on the third subportion 2133.

In some embodiments, as shown in FIGS. 8 to 8A and 16A to 16D, the mating end 201 includes a fifth surface 201*a* and a sixth surface 201*b* opposite to each other in the vertical direction 109. The fifth surface 201*a* and the sixth surface 201*b* may be two broadsides of the mating end 201. The mating end 201 also includes side edges that are opposite to each other in the longitudinal direction 105 and respectively connect the fifth surface 201*a* and the sixth surface 201*b*. The thickness of the mating end 201 between the fifth surface 201*a* and the sixth surface 201*b* may be less than the first thickness T1 of the thinner portion 211 between the first surface 211*a* and the first portion 2111*b*. The fifth surface 201*a* of the mating end 201 faces away from the tongue portion 103, and the sixth surface 201*b* faces towards the tongue portion 103. The sixth surface 201*b* may be flush with the first portion 2111*b* of the second surface 211*b* in the vertical direction 109, and the fifth surface 201*a* extends obliquely in the vertical direction 109 to connect with the first surface 211*a*. Such a configuration of the mating end 201 can facilitate the sliding of the mating conductive element 3 of the mating connector from the mating end 201 of the conductive element 200 to the mating portion 205.

The tongue portion 103 of the insulative housing supports the thicker portion 213 and the thinner portion 211 of the mating portion 205 of the conductive element 200. Alternatively or additionally, the tongue portion 103 includes a void recessed into the tongue portion 103 in the vertical direction 109 below at least a portion of at least one of the thicker portion 213 and the thinner portion 211 of the mating portion 205 of the conductive element 200. Providing the void below at least one of the portions of the conductive element 200 can reduce impedance variations along the signal transmission path, thereby reducing crosstalk and improving signal integrity.

Figure 11:
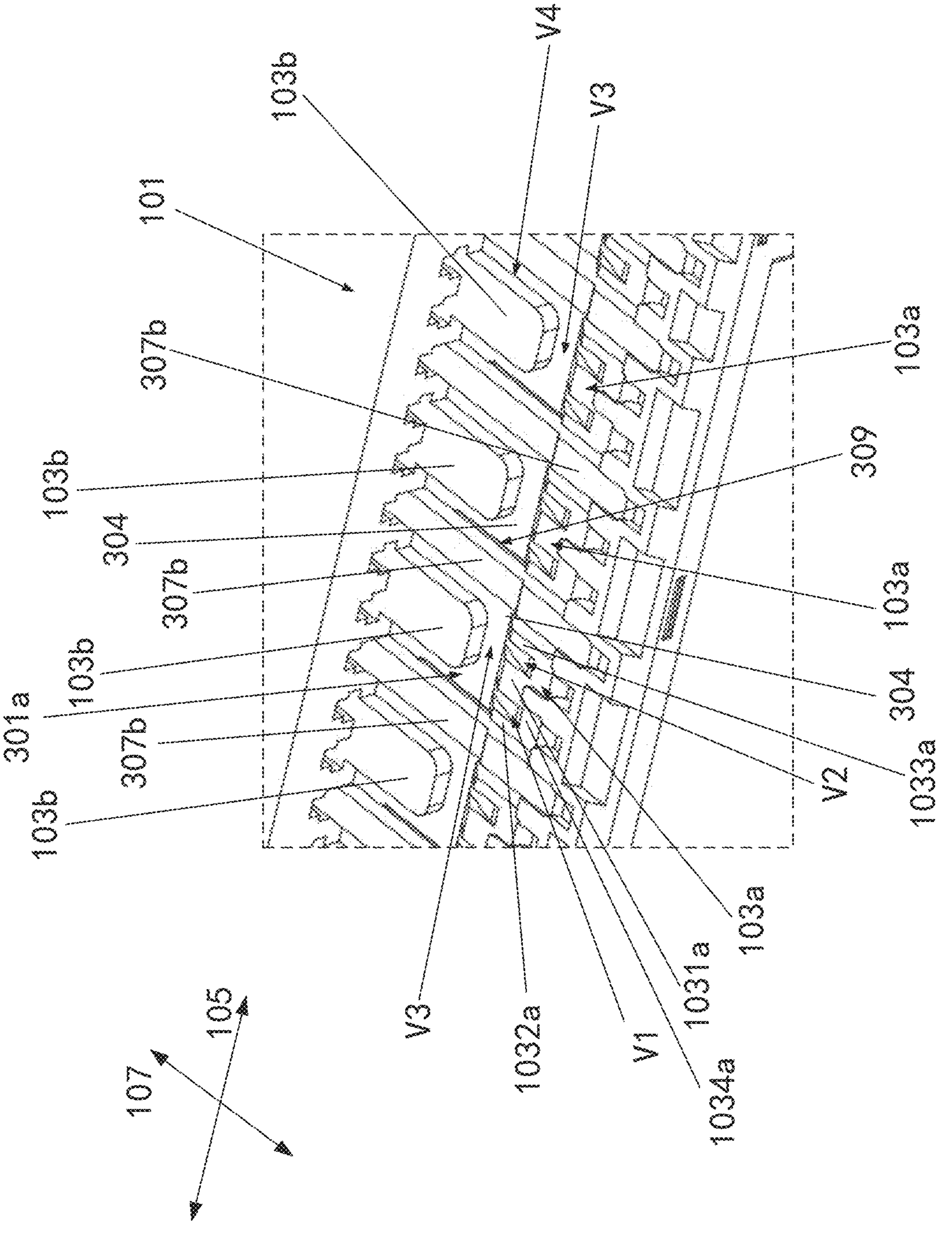
FIG. 11 is an enlarged view of area A circled by dashed lines in FIG. 10.
Figure 12:
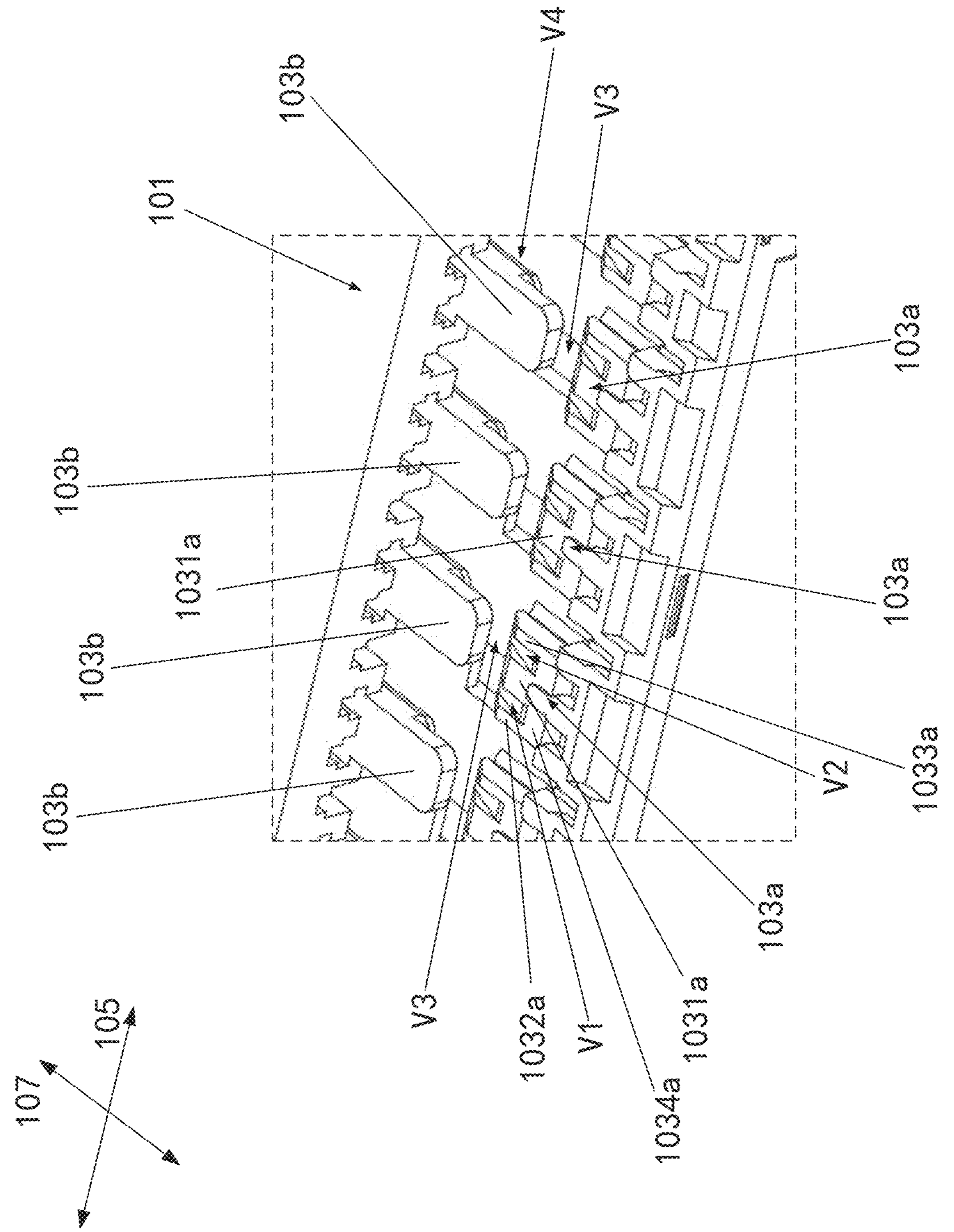
FIG. 12 is the enlarged view of FIG. 11, with the member hidden.
Figure 13:
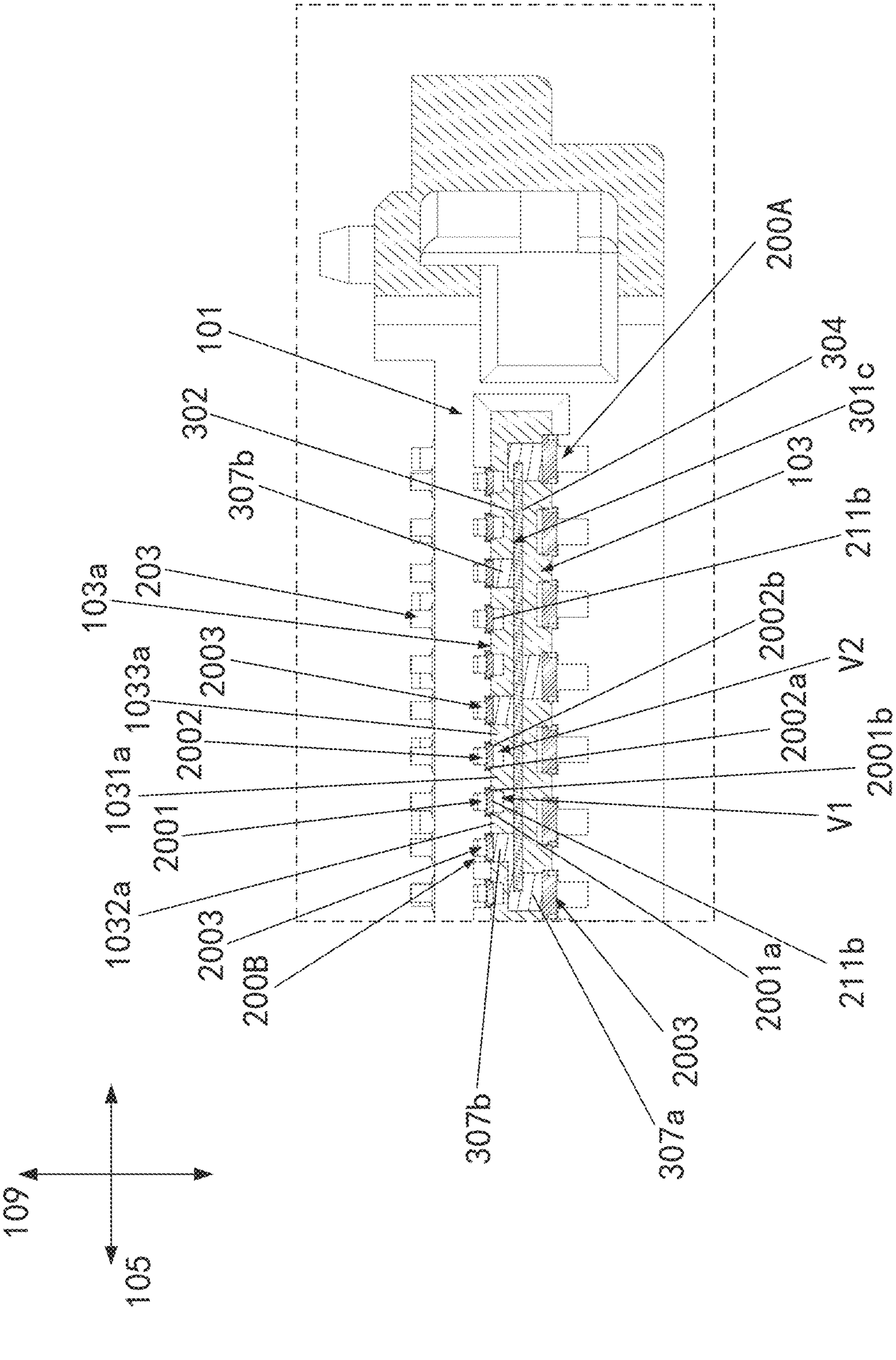
FIG. 13 is a cross-sectional view taken along line III-III in FIG. 10, illustrating the conductive elements and the member.

In some embodiments, as shown in FIGS. 10 to 13, the tongue portion 103 includes a plurality of first platforms 103*a* arranged in a first row in the longitudinal direction 105. Each of the plurality of first platforms 103*a* is configured to support the thinner portion 211 of the mating portion 205 of a first corresponding conductive element of the plurality of conductive elements 200. The first corresponding conductive is exemplarily indicated as "2001" in FIG. 13, which may, for example, have the same or similar configuration as the conductive element 200 shown in FIGS. 16A and 16B. The first platform 103*a* includes a first support portion 1031*a* and a second support portion 1032*a* separated from the first support portion 1031*a* by a void V1 in the longitudinal direction 105. As illustrated in FIG. 13, the second surface 211*b* of the thinner portion 211 of the mating portion 205 of the first corresponding conductive element 2001 faces towards the first platform 103*a*, and the second surface 211*b* is supported by the first support portion 1031*a* and the second support portion 1032*a*, respectively, at edge portions 2001*a* and 2001*b* (FIG. 13) opposite to each other along the longitudinal direction 105, such that the second surface 211*b* is partially disposed above the void V1.

In some embodiments, as shown in FIGS. 10 to 13, the first platform 103*a* may also be configured to support the thinner portion 211 of the mating portion 205 of a second corresponding conductive element of the plurality of conductive elements. The second corresponding conductive element is exemplarily indicated as "2002" in FIG. 13, which may also, for example, have the same or similar configuration as the conductive element 200 shown in FIGS. 16A and 16B. In some embodiments, the first corresponding conductive element 2001 and the second corresponding conductive element 2002 may have the same configurations. The first platform 103*a* also includes a third support portion 1033*a* separated from the first support portion 1031*a* by a void V2 different from the void V1 in the longitudinal direction 105. The second surface 211*b* of the thinner portion 211 of the mating portion 205 of the second corresponding conductive element 2002 faces towards the first platform 103*a*, and the second surface 211*b* is supported by the first support portion 1031*a* and the third support portion 1033*a*, respectively, at edge portions 2002*a* and 2002*b* (FIG. 13) opposite to each other along the longitudinal direction 105, such that the second surface 211*b* is partially disposed above the void V2. In the illustrated example, the thinner portions 211 of the mating portions 205 of the first corresponding conductive element and the second corresponding conductive element share one and the same first platform 103*a*.

In some embodiments, the first corresponding conductive element 2001 and the second corresponding conductive element 2002 may be configured as a differential signal pair for transmitting differential signals. In particular, the first corresponding conductive element 2001 may be energized by a first voltage, and the second corresponding conductive element 2002 may be energized by a second voltage. The voltage difference between the first corresponding conductive element 2001 and the second corresponding conductive element 2002 represents a signal.

In some embodiments, as shown in FIGS. 11 and 12, at least one of the void V1 and the void V2 may be adjacent to, in the mating direction 107, the location where the conductive element 200 establishes an electrical contact with the mating conductive element 3 at the thicker portion 213. In some embodiments, the first support portion 1031*a*, the second support portion 1032*a*, and the third support portion 1033*a* may be aligned with each other in the longitudinal direction 105.

In some embodiments, as shown in FIGS. 11 and 12, the first platform 103*a* may include a fourth support portion 1034*a* connecting the first support portion 1031*a*, the second support portion 1032*a*, and the third support portion 1033*a*. The fourth support portion 1034*a* supports portions of the second surfaces 211*b* of the first corresponding conductive element 2001 and the second corresponding conductive element 2002.

Alternatively or additionally, as shown in FIGS. 8 and 10 to 12, the tongue portion 103 of the insulative housing 100 may include a plurality of second platforms 103*b* arranged in a second row in the longitudinal direction 105. The second platforms 103*b* are configured to support thicker portions 213 of the mating portions 205 of the corresponding conductive elements. In some embodiments, the second row of the plurality of second platforms 103*b* may be parallel to the first row of the plurality of first platforms 103*a*. Each of the plurality of second platforms 103*b* is aligned with a corresponding one of the plurality of first platforms 103*a* in the mating direction 107 such that the second platform 103*b* supports the thicker portion 213 of the mating portion 205 of the first corresponding conductive element 2001. The second platform 103*b* is separated from the corresponding first platform 103*a* by a void V3 in the mating direction 107. The void V3 is positioned below the thicker portion 213 (in the vertical direction 109) in correspondence with the location where the conductive element 200 establishes an electrical contact with the mating conductive element 3 at the thicker portion 213. In some embodiments, the second platform 103*b* may also be configured to support the thicker portion 213 of the mating portion 205 of the second corresponding conductive element 2002. In the illustrated example, the thinner portions 211 of the mating portions 205 of the first corresponding conductive element 2001 and the second corresponding conductive element 2002 share a second platform 103*b*.

It should be appreciated that the present application may not be limited thereto. For example, the first corresponding conductive element 2001 and the second corresponding conductive element 2002 may correspond to one first platform 103*a* and one second platform 103*b*, respectively. It should also be appreciated that only the first platform 103*a* or the second platform 103*b* may be provided to support the corresponding conductive element.

In some embodiments, the edges of the thicker portion 213 of the corresponding conductive element may extend beyond the second platform 103*b* in the longitudinal direction 105, and the tongue portion 103 may include a void V4 below the edges (see FIGS. 11 and 12).

It should be contemplated that in some embodiments, for each of the plurality of conductive elements 200, the tongue portion 103 may include a first platform 103*a* supporting the thinner portion 211 of the mating portion 205 of the conductive element 200, and a second platform 103*b* supporting the thicker portion 213 of that mating portion 205. The first platform 103*a* and the second platform 103*b* may be aligned with each other in the mating direction 107 and separated by a void (e.g., the aforementioned void V3). The void may be positioned below the thicker portion 213 in correspondence with the location where the conductive element 200 establishes an electrical contact with the mating conductive element 3 at the thicker portion 213. In one of these embodiments, the first platform 103*a* includes two support portions (e.g., the first support portion 1031*a* and the second support portion 1032*a*, or the second support portion 1032*a* and the third support portion 1033*a*) separated by a void (e.g., the aforementioned void V1 or void V2) in the longitudinal direction 105. The second surface 211*b* of the thinner portion 211 of the mating portion 205 of the conductive element 200 faces towards the first platform 103*a*, and the second surface 211*b* is supported by the first support portion 1031*a* and the second support portion 1032*a*, respectively, at edge portions opposite to each other along the longitudinal direction 105, such that the second surface 211*b* is partially disposed above the void. In one of these embodiments, the void may be adjacent, in the mating direction 107, to the location where the conductive element 200 establishes an electrical contact with the mating conductive element 3 at the thicker portion 213.

In some embodiments, the tongue portion 103 may include portions that partially surround the mating end 201 of the conductive element 200, to aid in retaining the conductive element 200 and prevent warping. For example, the tongue portion 103 may include portions that at least partially surround the fifth surface 201*a* of the mating end 201 of the conductive element 200, to aid in retaining the conductive element 200.

The bottom row of conductive elements 200B may include a conductive element configured as a signal terminal and a conductive element configured as a ground terminal. In some embodiments, the conductive element configured as the signal terminal includes a plurality of pairs of signal terminals, such as the first corresponding conductive element 2001 and the second corresponding conductive element 2002 that may be configured as a differential signal pair as described above. The ground terminal may separate the pairs of signal terminals from each other. The conductive element configured as the ground terminal is exemplarily marked with "2003" in the appended drawings. The ground terminal 2003 may also have the same or similar configuration as the conductive element shown in FIGS. 16A and 16B, for example. In some embodiments, the ground terminal 2003 may have a consistent thickness along the length thereof.

As shown in FIGS. 4, 6, and 13 to 17, the ground terminals 2003 may separate the plurality of pairs of signal terminals (labeled as "2001" and "2002" in the figures) from each other. For example, the ground terminals 2003 ("G") and signal terminals ("S") 2001 and 2002 can be arranged in a "G-S-S-G-S-S . . . G-S-S" pattern, with two adjacent pairs of signal terminals 2001 and 2002 sharing a ground terminal 2003. Separating the plurality of pairs of signal terminals 2001 and 2002 from each other by the ground terminals 2003 can reduce crosstalk between signals, thereby improving signal integrity.

It should be appreciated that the top row of conductive elements 200A may have a similar configuration to the bottom row of conductive elements 200B.

Figure 4:
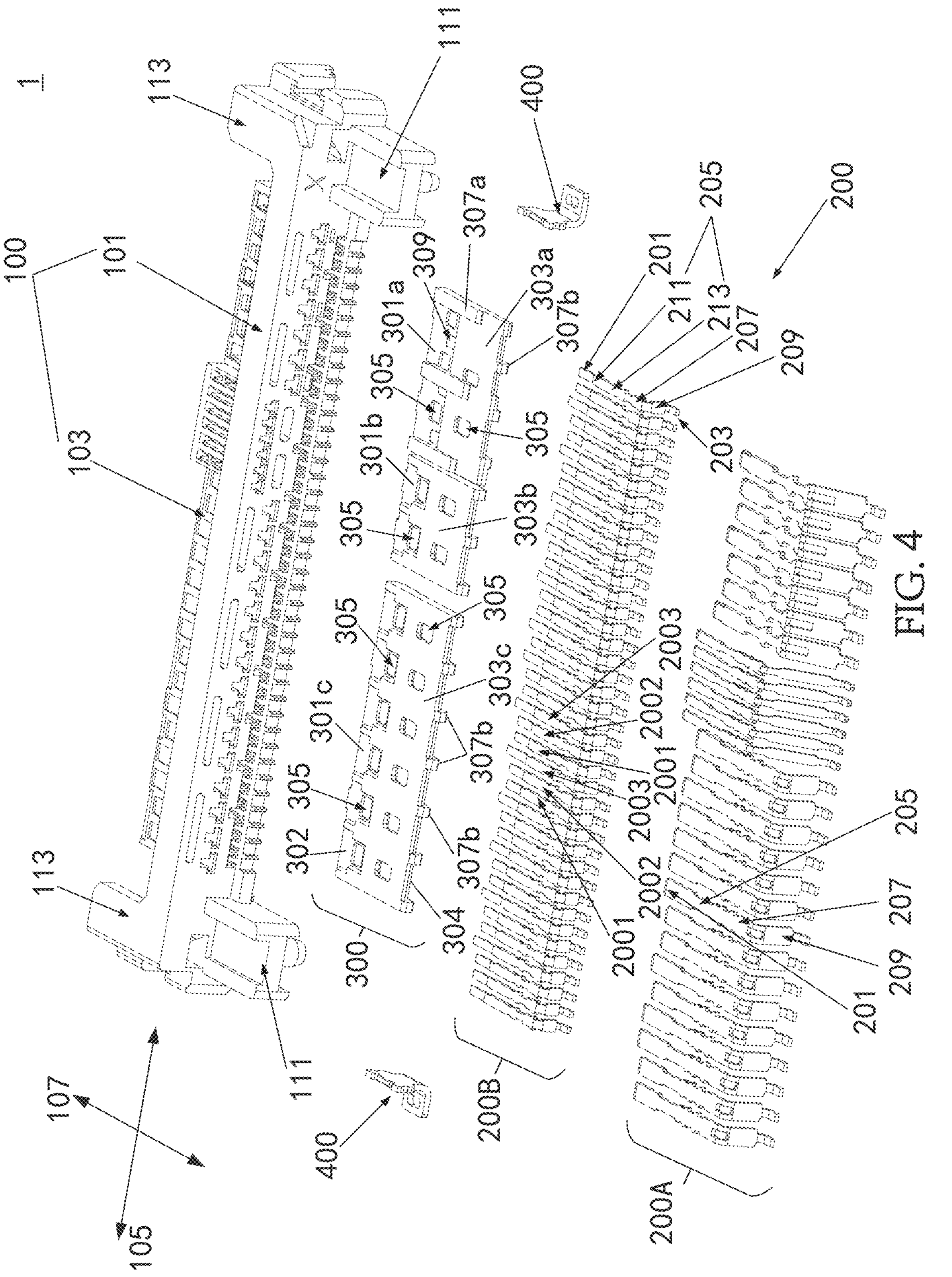
FIG. 4 is an exploded view of the electrical connector of FIG. 1.
Figure 5:
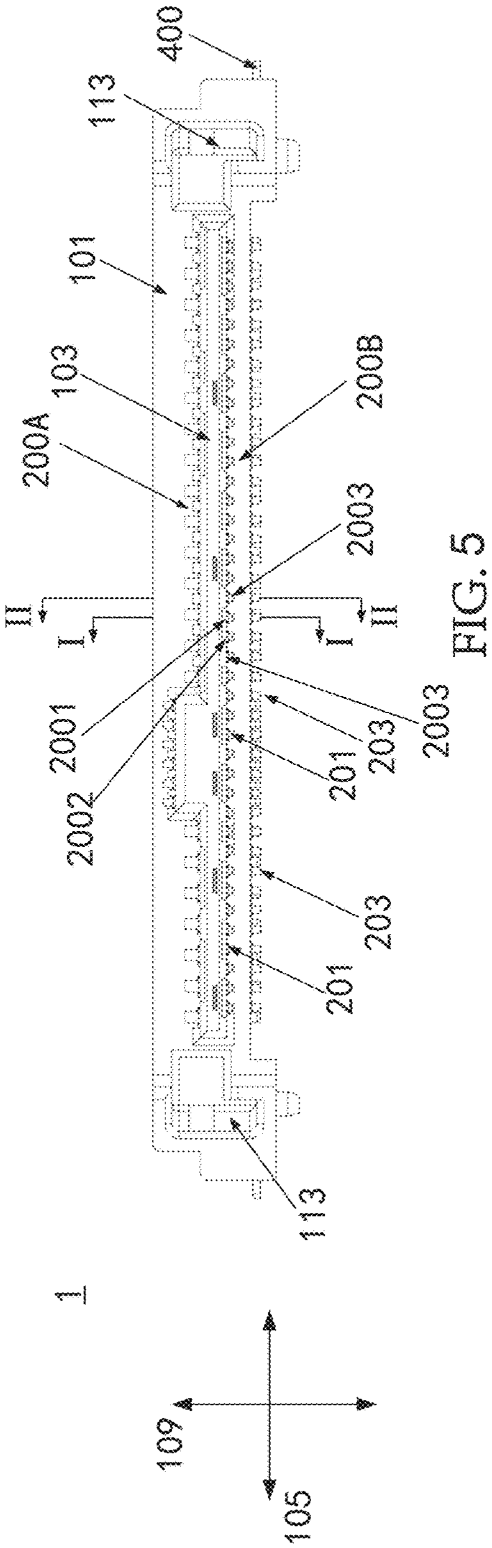
FIG. 5 is a front view of the electrical connector of FIG. 1.
Figure 6:
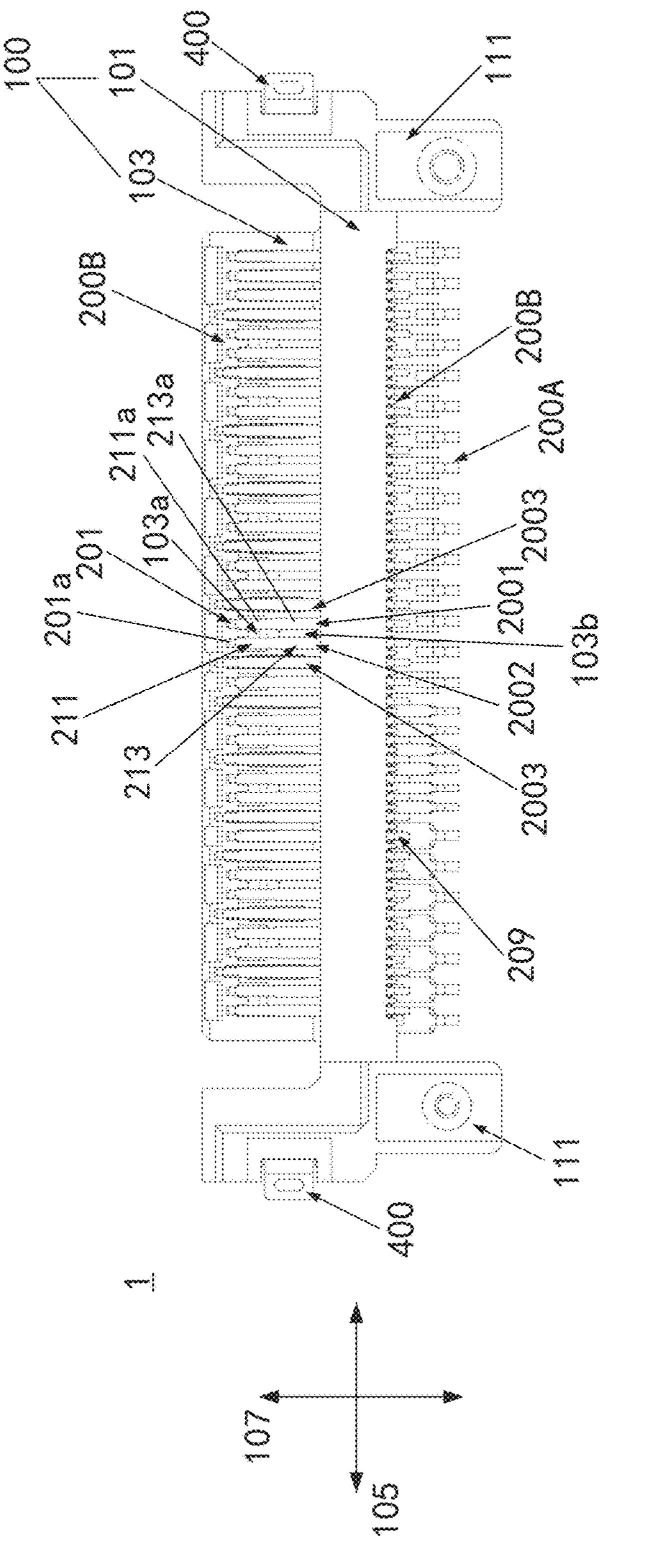
FIG. 6 is a bottom view of the electrical connector of FIG. 1.
Figure 7:
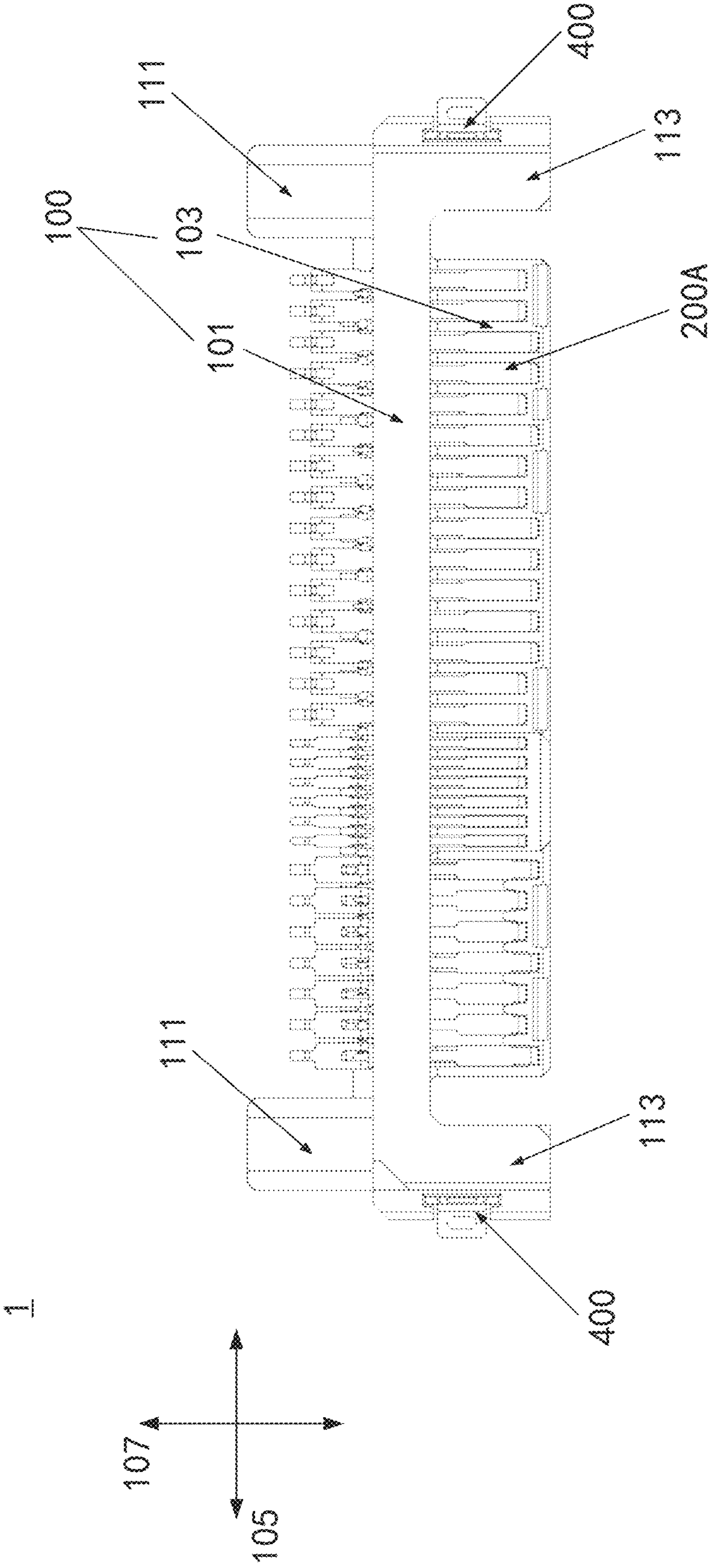
FIG. 7 is a top view of the electrical connector of FIG. 1.
Figure 17A:
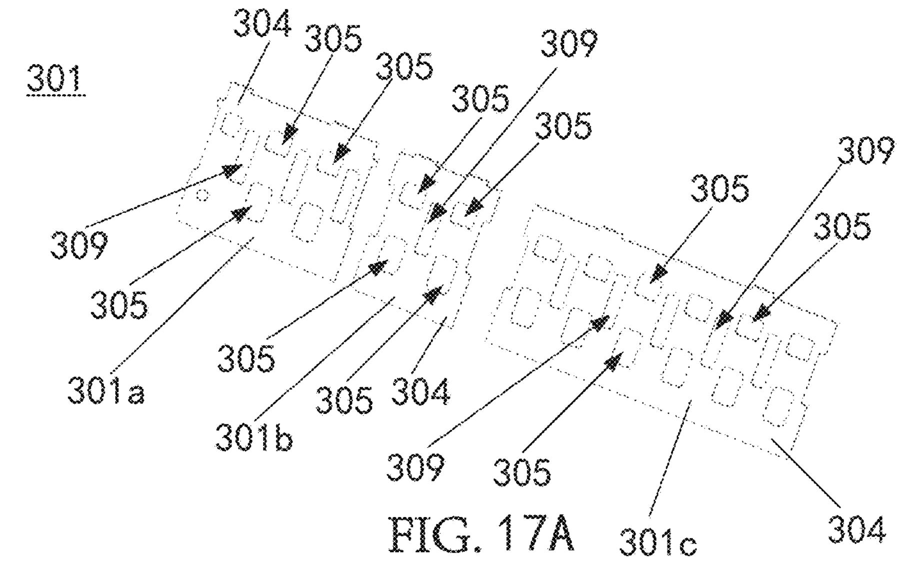
FIG. 17A is a perspective view of a conductive plate of the member of the electrical connector of FIG. 1.

In some embodiments, as shown in FIGS. 4, 10, 11, and 13 to 15, the electrical connector 1 may include a member 300 disposed in the insulative housing 100. For example, the member 300 may include a conductive plate 301. As shown in FIGS. 4 and 17A, the conductive plate 301 is substantially planar and may be formed of a metal. The conductive plate 301 includes a first surface 302 and a second surface 304 opposite to each other. The conductive plate 301 may be oriented parallelly to the mating direction 107 and the longitudinal direction 105 in insulative housing 100.

As illustrated in FIG. 13, the top row of conductive elements 200A and the bottom row of conductive elements 200B are held on opposite sides of the member 300 by the insulative housing 100. The conductive plate 301 may extend in the mating direction 107 at least in the tongue portion 103 of the insulative housing 100. In this way, it is possible to provide shielding between the conductive elements 200 on opposite sides of the member 300, thereby improving signal integrity.

As shown in FIGS. 4, 14 to 15, and 17A, the conductive plate 301 defines a plurality of first openings 305. Each of the plurality of first openings 305 extends through the conductive plate 301. In some embodiments, for each of the signal terminals 2001 and 2002 of the bottom row of conductive elements 200B, at least a portion of the thinner portion 211 of the mating portion 205 is disposed above a corresponding one of the plurality of first openings 305 of the conductive plate 301. For example, at least a portion of the thinner portion 211 of the mating portion 205 overlaps with the corresponding first opening in the vertical direction 109. It should be appreciated that the signal terminals of the top row of conductive elements 200A may be configured in a similar manner.

The inventor has recognized and appreciated that when the electrical connector 1 is mated with the mating connector, the electrical connector 1 and the mating connector may define a mating region on the tongue portion 103 along the mating direction 107. The mating region may be defined, for example, as an area in which one or both of the ground terminals and the signal terminals of the electrical connector 1 overlap with the corresponding mated terminals of the mating connector. The inventor has also recognized and appreciated that when the total open area of the conductive plate 301 increases, the impedance at the mating region also increases. For example, if the conductive plate 301 does not have any opening, its total open area is zero, the impedance at the mating region is substantially lower than the expected impedance of the electrical connector assembly composed of the electrical connector 1 and the mating connector, resulting in a mismatch of the impedance at the mating region with respect to the expected impedance of the electrical connector assembly.

Providing at least a portion of the thinner portion 211 of the mating portion 205 above the corresponding one of the plurality of first openings 305 of the conductive plate 301 enables that the impedance at the mating region can substantially match with the expected impedance of the electrical connector assembly composed of the electrical connector 1 and the mating connector when the electrical connector 1 is mated with the mating connector, and the crosstalk can be reduced, thereby improving signal integrity. In some embodiments, the first opening 305 may be configured to completely overlap with the thinner portion 211 of the mating portion 205 in the vertical direction 109. In some embodiments, a plurality of first openings 305 may be disposed in the conductive plate 301 along the mating portion 205. For example, at least a portion of the thicker portion 213 of the mating portion 205 may also be disposed above a corresponding one of the plurality of first openings 305. The area of each of the plurality of first openings 305 may be reduced to reduce crosstalk at the mating region. For example, when the electrical connector 1 is mated with the mating connector, the area of each of the plurality of first openings 305 may be smaller than the wavelength of the signal transmitted across the signal terminals of the electrical connector 1 and the corresponding mating element of the mating connector. The area of each of the plurality of first openings 305 may be reduced as the frequency of the signal transmitted across the signal terminals and the corresponding mating terminals increases. Thus, the number and area of the first openings 305 and the total open area of the conductive plate 301 may be configured to substantially match the impedance at the mating region with the expected impedance of the electrical connector assembly and to reduce crosstalk, thereby improving signal integrity.

In some embodiments, for each of the signal terminals 2001 and 2002 of the bottom row of conductive elements 200B, the mating portion 205 may be separated from the member 300 by a void. For example, as shown in FIG. 8, the signal terminals 2001 may be separated from the member 300 by a void (e.g., the aforementioned void V3). For example, the signal terminal 2001 includes a portion separated from the member 300 by air.

Figure 14:
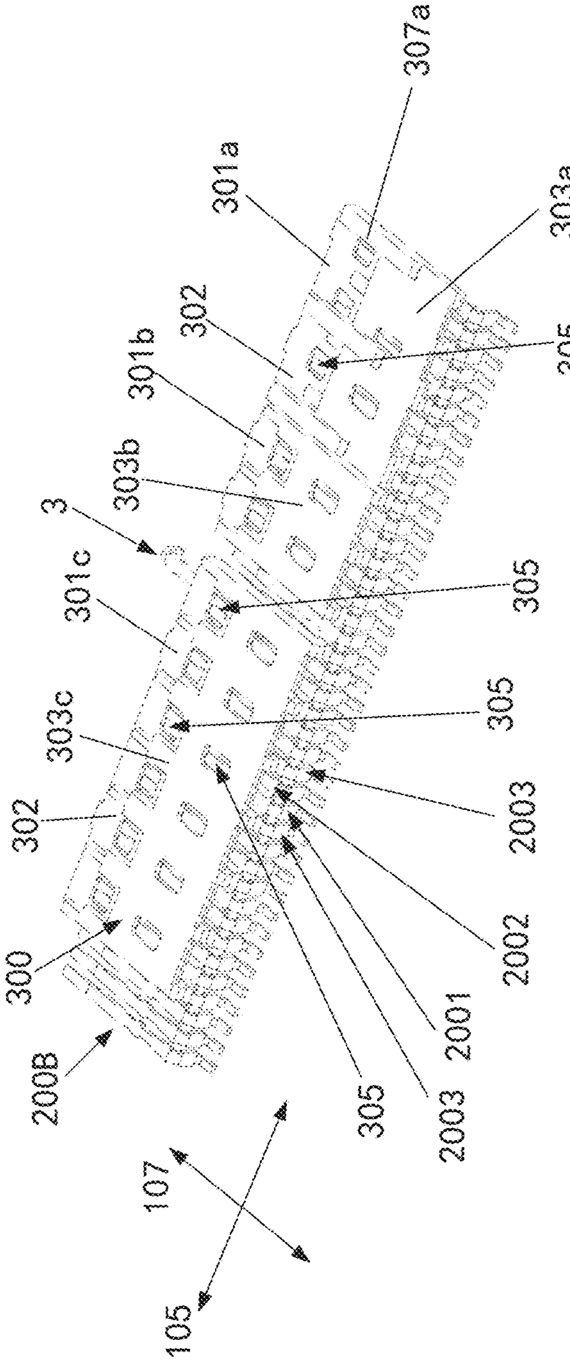
FIG. 14 is a top, rear perspective view of the member and the bottom row of conductive elements of the electrical connector of FIG. 1 in an assembled state, also illustrating an exemplary mating conductive element of an exemplary mating connector mated with a corresponding conductive element in the bottom row of conductive elements.
Figure 15:
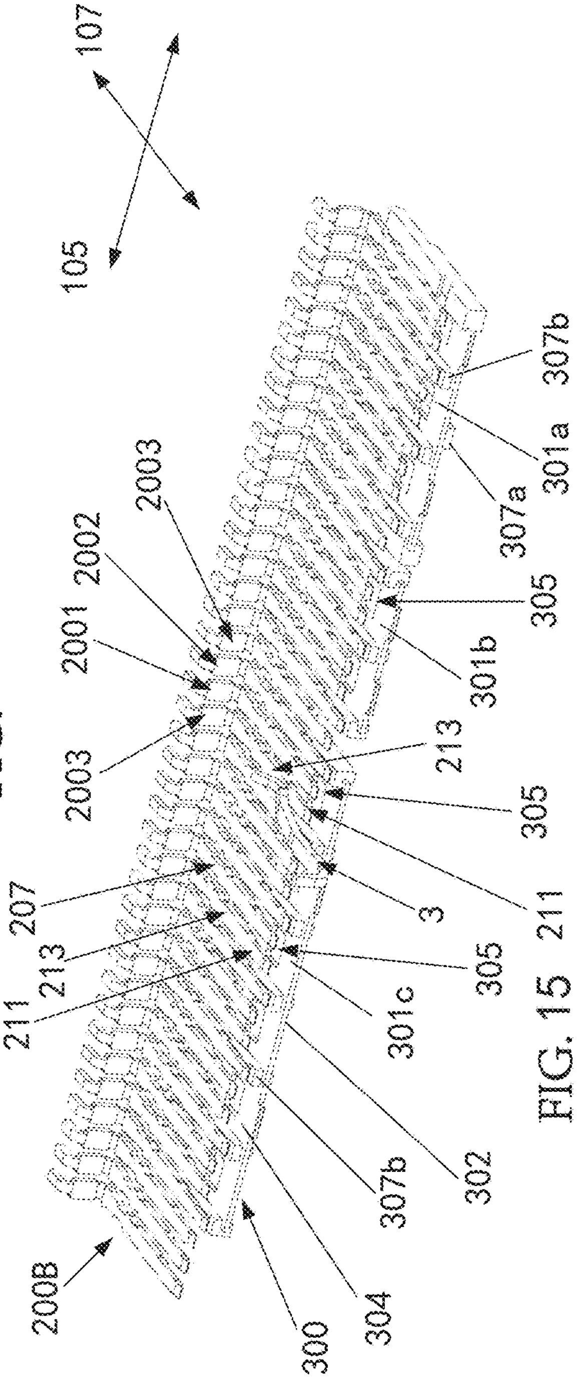
FIG. 15 is a bottom, front perspective view of the member and the bottom row of conductive elements of FIG. 14 in the assembled state, also illustrating the exemplary mating conductive element of the exemplary mating connector mated with the corresponding conductive element in the bottom row of conductive elements.

In some embodiments, as shown in FIGS. 14 to 15, the conductive plate 301 may extend along substantially the entire length of the mating portions 205 and intermediate portions 207 of the signal terminals 2001 and 2002 and the ground terminals 2003 in the mating direction 107. As used herein, the term "substantially" may mean, for example, most, or almost all, or all, or an amount in the range of about 80% to about 100%.

In some embodiments, an extending range of the conductive plate 301 in the longitudinal direction 105 at least overlaps with the signal terminals 2001 and 2002 and the ground terminals 2003. For example, the extending range of the conductive plate 301 in the longitudinal direction 105 may overlap with all of the conductive elements 200 of the bottom row of conductive elements 200B.

Figure 17B:
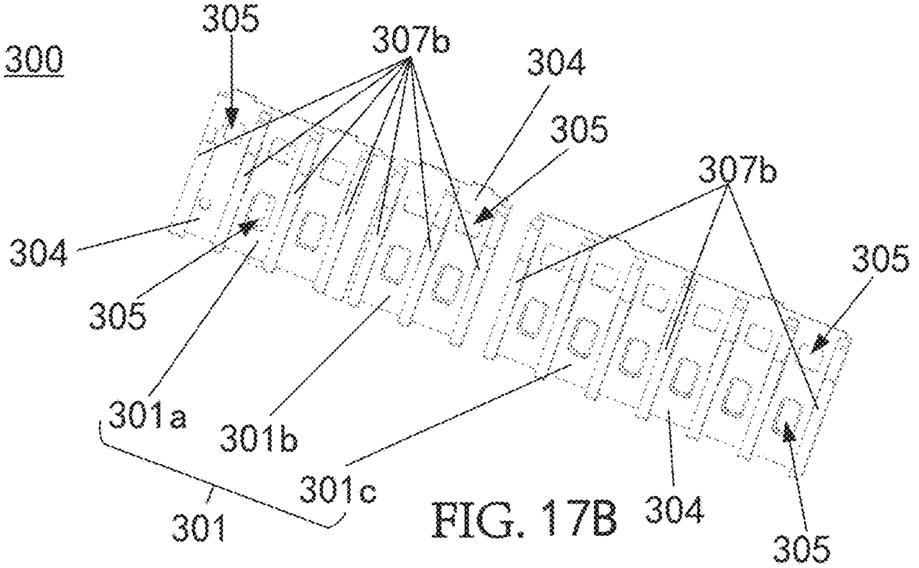
FIG. 17B is a bottom perspective view of the member of the electrical connector of FIG. 1 conductive plate.
Figure 17C:
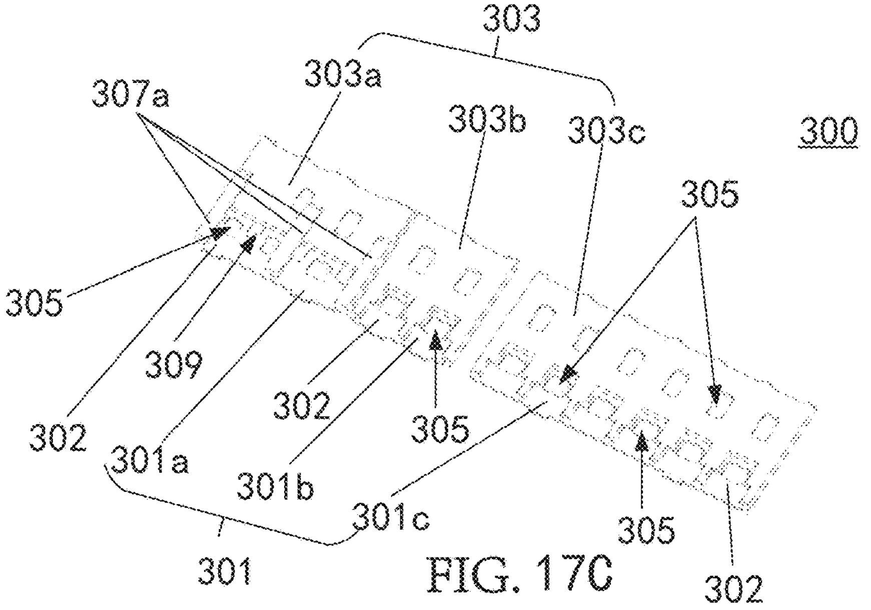
FIG. 17C is a top perspective view of the member of FIG. 17B.

In some embodiments, as shown in FIGS. 17B and 17C, the member 300 may also include a lossy material 303 disposed on the conductive plate 301. For example, the lossy material 303 may be overmolded on the conductive plate 301. For example, the lossy material 303 may be a lossy material piece overmolded on the conductive plate 301. It should be appreciated that the lossy material 303 may also be assembled to the conductive plate 301 by any other suitable process. The insulative housing 100 may also be overmolded on the member 300. For example, the insulative housing 100 may be an insulating material piece overmolded on the member 300. It should be appreciated that the member 300 can also be assembled into the insulative housing 100 by any other suitable process. Overmolding the insulative housing 100 onto the member 300 allows the integrity of the electrical connector 1 to be improved.

Materials that dissipate a sufficient portion of the electromagnetic energy interacting with that material to appreciably impact the performance of a connector may be regarded as lossy. A meaningful impact results from attenuation over a frequency range of interest for a connector. In some configurations, lossy material may suppress resonances within ground structures of the connector and the frequency range of interest may include the natural frequency of the resonant structure, without the lossy material in place. In other configurations, the frequency range of interest may be all or part of the operating frequency range of the connector.

For testing whether a material is lossy, the material may be tested over a frequency range that may be smaller than or different from the frequency range of interest of the connector in which the material is used. For example, the test frequency range may extend from 10 GHz to 25 GHz or 1 GHz to 5 GHz. Alternatively, lossy material may be identified from measurements made at a single frequency, such as 10 GHz or 15 GHz.

Loss may result from interaction of an electric field component of electromagnetic energy with the material, in which case the material may be termed electrically lossy.

Alternatively or additionally, loss may result from interaction of a magnetic field component of the electromagnetic energy with the material, in which case the material may be termed magnetically lossy.

Electrically lossy materials can be formed from lossy dielectric and/or poorly conductive materials. Electrically lossy material can be formed from material traditionally regarded as dielectric materials, such as those that have an electric loss tangent greater than approximately 0.01, greater than 0.05, or between 0.01 and 0.2 in the frequency range of interest. The "electric loss tangent" is the ratio of the imaginary part to the real part of the complex electrical permittivity of the material.

Electrically lossy materials can also be formed from materials that are generally thought of as conductors, but are relatively poor conductors over the frequency range of interest. These materials may conduct, but with some loss, over the frequency range of interest such that the material conducts more poorly than a conductor of an electrical connector, but better than an insulator used in the connector. Such materials may contain conductive particles or regions that are sufficiently dispersed such that they do not provide high conductivity or otherwise are prepared with properties that lead to a relatively weak bulk conductivity compared to a good conductor such as pure copper over the frequency range of interest. Die cast metals or poorly conductive metal alloys, for example, may provide sufficient loss in some configurations.

Electrically lossy materials of this type typically have a bulk conductivity of about 1 Siemen/meter to about 100,000 Siemens/meter, or about 1 Siemen/meter to about 30,000 Siemens/meter, or 1 Siemen/meter to about 10,000 Siemens/meter. In some embodiments, material with a bulk conductivity of between about 1 Siemens/meter and about 500 Siemens/meter may be used. As a specific example, material with a conductivity between about 50 Siemens/meter and 300 Siemens/meter may be used. However, it should be appreciated that the conductivity of the material may be selected empirically or through electrical simulation using known simulation tools to determine a conductivity that provides suitable signal integrity (SI) characteristics in a connector. The measured or simulated SI characteristics may be, for example, low cross talk in combination with a low signal path attenuation or insertion loss, or a low insertion loss deviation as a function of frequency.

It should also be appreciated that a lossy member need not have uniform properties over its entire volume. A lossy member, for example, may have an insulative skin or a conductive core, for example. A member may be identified as lossy if its properties on average in the regions that interact with electromagnetic energy sufficiently attenuate the electromagnetic energy.

In some embodiments, lossy material is formed by adding to a binder a filler that contains particles. In such an embodiment, a lossy member may be formed by molding or otherwise shaping the binder with filler into a desired form. The lossy material may be molded over and/or through openings in conductors, which may be ground conductors or shields of the connector. Molding lossy material over or through openings in a conductor may ensure intimate contact between the lossy material and the conductor, which may reduce the possibility that the conductor will support a resonance at a frequency of interest. This intimate contact may, but need not, result in an Ohmic contact between the lossy material and the conductor.

Alternatively or additionally, the lossy material may be molded over or injected into insulative material, or vice versa, such as in a two shot molding operation. The lossy material may press against or be positioned sufficiently near a ground conductor such that there is appreciable coupling to a ground conductor. Intimate contact is not a requirement for the electrical coupling between the lossy material and the conductor, as sufficient electrical coupling, such as a capacitive coupling, between a lossy member and a conductor may yield the desired result. For example, in some scenarios, 100 pF of coupling between a lossy member and a ground conductor may provide an appreciable impact on the suppression of the resonance in the ground conductor. In other examples with frequencies in the range of approximately 10 GHz or higher, a reduction in the amount of electromagnetic energy in a conductor may be provided by sufficient capacitive coupling between a lossy material and the conductor with a mutual capacitance of at least about 0.005 pF, such as in a range between about 0.01 pF to about 100 pF, between about 0.01 pF to about 10 pF, or between about 0.01 pF to about 1 pF. To determine whether lossy material is coupled to a conductor, coupling may be measured at a test frequency, such as 15 GHz or over a test range, such as 10 GHz to 25 GHz.

To form an electrically lossy material, the filler may be conductive particles. Examples of conductive particles that may be used as a filler to form an electrically lossy material include carbon or graphite formed as fibers, flakes, nanoparticles, or other types of particles. Various forms of fiber, in woven or non-woven form, coated or non-coated may be used. Non-woven carbon fiber is one suitable material. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake.

Preferably, the fillers will be present in a sufficient volume percentage to allow conducting paths to be created from particle to particle. For example, when metal fiber is used, the fiber may be present in about 3% to 30% by volume. The amount of filler may impact the conducting properties of the material, and the volume percentage of filler may be lower in this range to provide sufficient loss.

The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

While the above-described binder materials may be used to create an electrically lossy material by forming a binder around conducting particle fillers, lossy materials may be formed with other binders or in other ways. In some examples, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Materials with higher loss tangents may also be used.

In some embodiments, a magnetically lossy material may be formed of a binder or matrix material filled with particles that provide that layer with magnetically lossy characteristics. The magnetically lossy particles may be in any convenient form, such as flakes or fibers. Ferrites are common magnetically lossy materials. Materials such as magnesium ferrite, nickel ferrite, lithium ferrite, yttrium garnet or aluminum garnet may be used. Ferrites will generally have a loss tangent above 0.1 at the frequency range of interest. Presently preferred ferrite materials have a loss tangent between approximately 0.1 and 1.0 over the frequency range of 1 GHz to 3 GHz and more preferably a magnetic loss tangent above 0.5 over that frequency range.

Practical magnetically lossy materials or mixtures containing magnetically lossy materials may also exhibit useful amounts of dielectric loss or conductive loss effects over portions of the frequency range of interest. Suitable materials may be formed by adding fillers that produce magnetic loss to a binder, similar to the way that electrically lossy materials may be formed, as described above.

It is possible that a material may simultaneously be a lossy dielectric or a lossy conductor and a magnetically lossy material. Such materials may be formed, for example, by using magnetically lossy fillers that are partially conductive or by using a combination of magnetically lossy and electrically lossy fillers.

A lossy member also may be formed in a number of ways. In some examples the binder material, with fillers, may be molded into a desired shape and then set in that shape. In other examples the binder material may be formed into a sheet or other shape, from which a lossy member of a desired shape may be cut. In some embodiments, a lossy member may be formed by interleaving layers of lossy and conductive material such as a metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, a lossy member may be formed by plating plastic or other insulative material with a lossy coating, such as a diffuse metal coating.

The lossy material 303 of the member 300 may be configured to electrically couple together at least two ground terminals of the top row of conductive elements 200A and the bottom row of conductive elements 200B. In some embodiments, the lossy material 303 may electrically couple together at least two ground terminals of the bottom row of conductive elements 200B. In some embodiments, the lossy material 303 may electrically couple together at least two ground terminals of the top row of conductive elements 200A. In some embodiments, the lossy material 303 may electrically couple together at least two ground terminals of both the top row of conductive elements 200A and the bottom row of conductive elements 200B.

Embodiments in which the lossy material 303 electrically couples together at least two ground terminals of both the top row of conductive elements 200A and the bottom row of conductive elements 200B are described below with reference to FIGS. 4, 10 to 11, 14 to 15, and 17B to 17C.

As shown in FIGS. 4, 10 to 11, 14 to 15, and 17B to 17C, the lossy material 303 includes at least two protrusions (labeled as "307*a*" and "307*b*" in the appended drawings) protruding from the conductive plate 301 and extending towards the aforementioned at least two ground terminals (labeled as "2003" in the appended drawings). Each protrusion is elongated in the mating direction 107. The lossy material 303 is electrically coupled to each of the aforementioned at least two ground terminals 2003 via a corresponding one of the at least two protrusions. Electrically coupling the lossy material 303 to the ground terminals allows the effect of electrical resonance to be reduced, thereby improving signal integrity. In particular, when the electrical resonance occurs at a frequency within the operating frequency range of the electrical connector 1, the integrity of the high-speed signal passing through the electrical connector 1 deteriorates. The deterioration in the integrity of the signal passing through the electrical connector 1 is partially caused by the loss of signal energy coupled into the resonant signal, which means that less signal energy passes through the electrical connector 1. The deterioration of the integrity of the signal passing through the electrical connector 1 is also partially caused by the coupling of the resonant signal from the ground terminals to the signal terminals. The resonant signal accumulates and possesses a high amplitude, so when the resonant signal is coupled from the ground terminals to the signal terminals, it will generate a large amount of noise that interferes with the signal. Sometimes, the resonant signal coupled to the signal terminals is also referred to as crosstalk. As is known in the art, the frequency at which electrical resonance occurs is related to the length of the ground terminals supporting the electrical resonance, the reason is that the wavelength of the resonant signal is related to the length of the ground terminals supporting the resonance, and the frequency is inversely proportional to the wavelength. Electrically coupling the lossy material 303 to the ground terminals may enable energy coupled into the ground terminals and accumulated into a resonant signal to be dissipated in the lossy material 303, which makes the occurrence of electrical resonance less likely, thereby increasing signal integrity and improving the operating frequency range of the electrical connector 1.

Each of the at least two protrusions of the lossy material 303 is electrically coupled to at least a mating portion of a corresponding one of the aforementioned at least two ground terminals 2003 (the mating portion may have the same or similar configuration as the mating portion 205 described above). In some embodiments, the protrusions of the lossy material 303 may be electrically coupled only to the mating portion of the corresponding ground terminal 2003. In some embodiments, the protrusions of the lossy material 303 may be electrically coupled to both the intermediate portion (which may have the same or similar configuration as the intermediate portion 207 described above) and the mating portion of the corresponding ground terminal 2003. In some embodiments, the protrusions of the lossy material 303 may be electrically coupled to only the intermediate portion of the corresponding ground terminal 2003.

Figure 9:
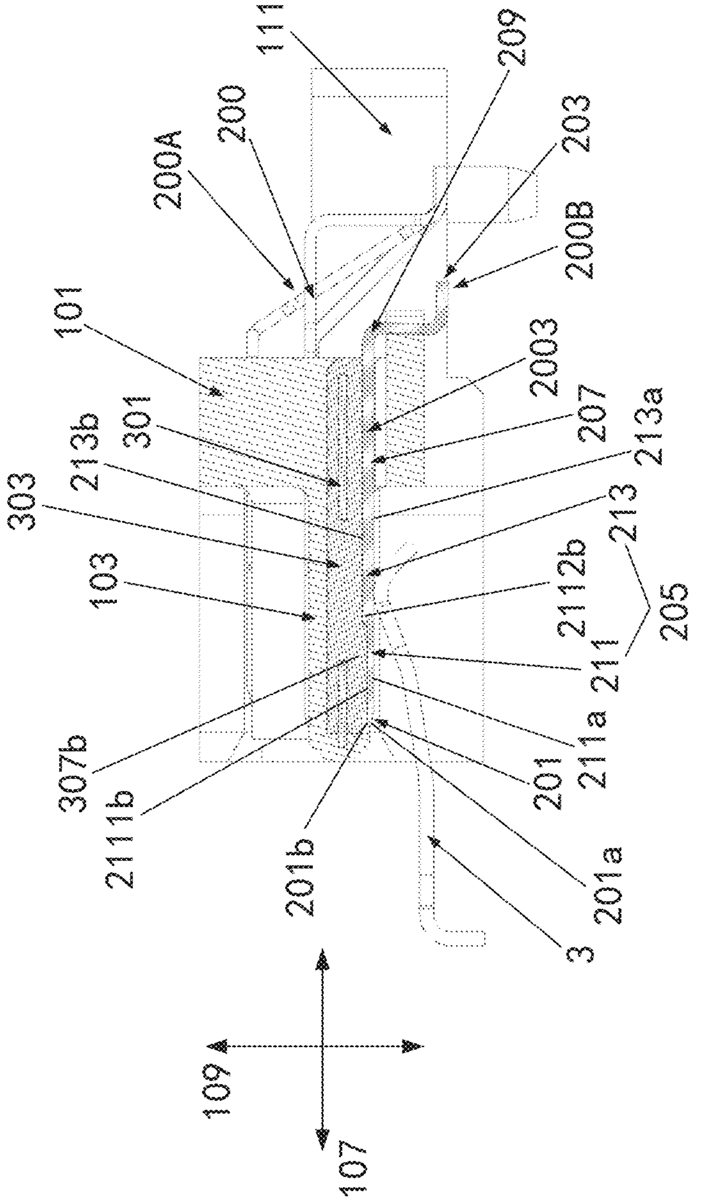
FIG. 9 is a cross-sectional view of the electrical connector of FIG. 1 taken along line II-II in FIG. 5, also illustrating an exemplary mating conductive element of an exemplary mating connector mated with a conductive element of the electrical connector.
Figure 10:
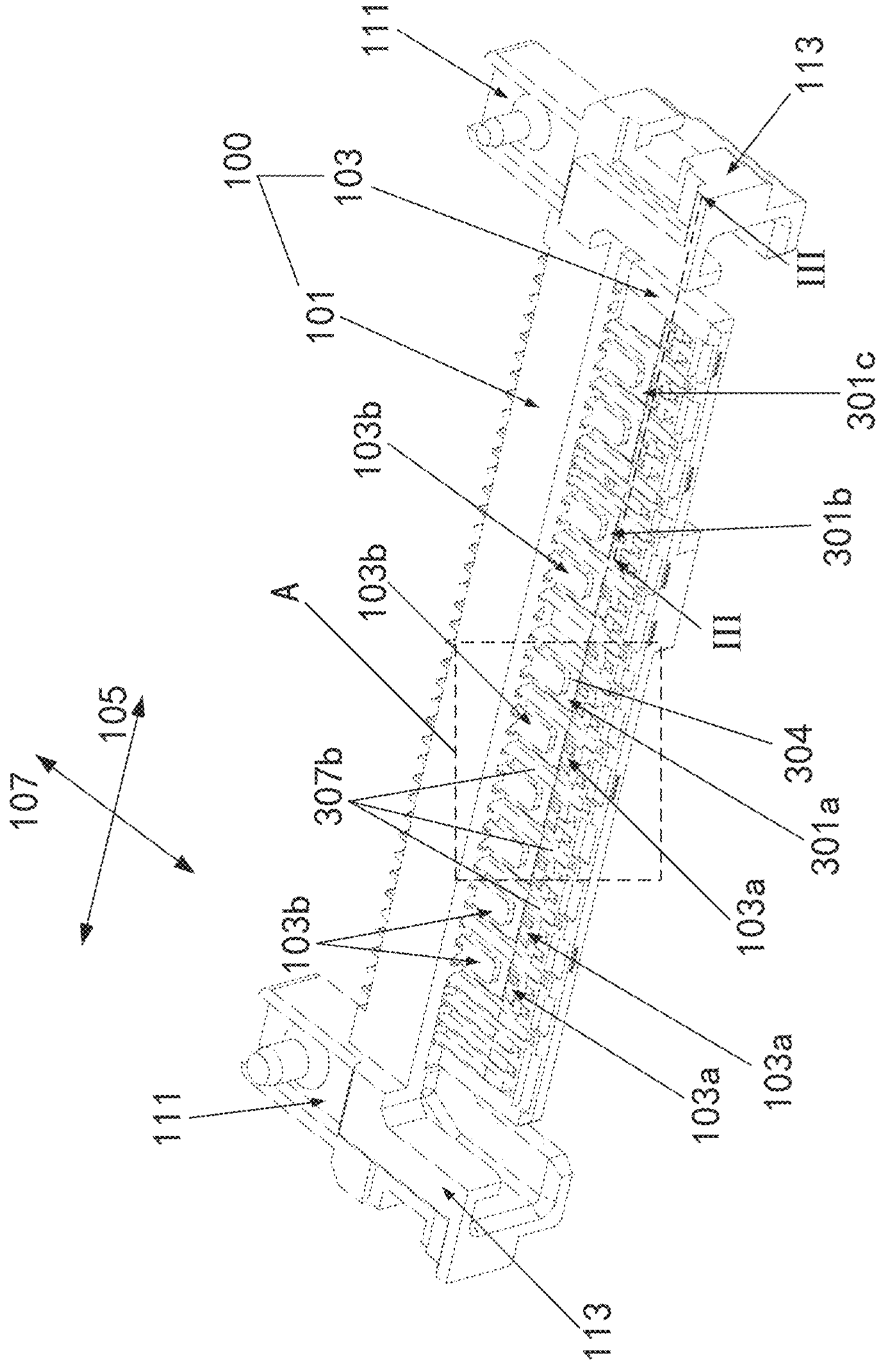
FIG. 10 is a top, front perspective view of the electrical connector of FIG. 1, with the conductive elements hidden.

In some embodiments, the protrusion of the lossy material 303 may be in direct contact with the corresponding ground terminal 2003, thereby achieving electrical coupling. For example, As illustrated in FIG. 9, at least a portion of the protrusion of the lossy material 303 may protrude from the tongue portion 103 of the insulative housing 100 to be in direct contact with at least a portion of the mating portion of the corresponding one ground terminal 2003 (e.g., with at least one of the thinner portion and the thicker portion of the mating portion) and support the mating portion. In addition, a portion of the protrusions of the lossy material 303 may be in direct contact with the intermediate portion of the corresponding one of the ground terminals 2003 in the base portion 101.

In some embodiments, the protrusion of the lossy material 303 may be sufficiently close to the corresponding ground terminal to capacitively couple with the corresponding ground terminal, thereby achieving electrical coupling. In such embodiments, there is a gap between the protrusion and the corresponding ground terminal. In an optional example, the gap may be filled by the insulative housing 100 such that the protrusion may be spaced apart from the corresponding ground terminal by the insulative housing 100.

In some embodiments, as shown in FIGS. 9 and 14 to 15 and 17B to 17C, the lossy material 303 does not overlap with the first opening 305. The insulative housing 100 may completely fill the first opening 305. This helps to secure the conductive plate 301 in the insulative housing 100, and therefore helps to secure the member 300 in the insulative housing 100. In some other examples, the insulative housing 100 may not overlap with the first opening 305.

In some embodiments, as shown in FIGS. 17B to 17C, the conductive plate 301 may define a plurality of second openings 309 that extend through the conductive plate 301. The lossy material 303 extends from a first side of the conductive plate 301 through second openings 309 to a second side of the conductive plate 301 opposite to the first side. In this way, portions of the lossy material 303 on the first side and the second side of the conductive plate 301 may be joined together. The lossy material 303 may be reliably secured to the conductive plate 301 by extending the lossy material 303 through the second opening 309. The second opening 309 does not overlap with the first opening 305. In some examples, the second opening 309 may at least partially overlap with the area where the lossy material 303 is electrically coupled to the at least two ground terminals.

In some embodiments, as shown in FIGS. 4, 10, and 17B to 17C, the conductive plate 301 may include a plurality of conductive plate portions, which are shown as three conductive plate portions 301*a*, 301*b*, and 301*c* in the figures. Accordingly, the lossy material 303 may also include a plurality of lossy material portions, which are shown as three lossy material portions 303*a*, 303*b*, and 303*c* in the figures. Each of the plurality of lossy material portions 303*a*, 303*b*, and 303*c* is disposed on a corresponding one of the plurality of conductive plate portions 301*a*, 301*b*, and 301*c*. It should be appreciated that, In some embodiments, the conductive plate 301 may be a single integral piece of conductive plate, and accordingly, lossy material 303 is a single integral piece of lossy material disposed on the conductive plate 301.

In some embodiments, as shown in FIG. 1, the insulative housing 100 may include at least one rear portion 111 (shown as two in the drawings) extending oppositely to the tongue portion 103 from the base portion 101 in the mating direction 107. The rear portion 111 is configured for to be mounted to a circuit board (not shown). The insulative housing 100 may also include a mount holder receiver 111*b* formed adjacent to the rear portion 111 on the insulative housing 100 for receiving a board holder 400. The board holder 400 may be used to reliably retain the electrical connector 1 on the circuit board. Although the board holder 400 is shown in the form of a hold down piece, it should be appreciated that the present application may not be limited thereto.

In some embodiments, as shown in FIG. 1, the insulative housing 100 may include at least one front portion 113 (shown as two in the drawings) extending parallelly to the tongue portion 103 from the base portion 101 in the mating direction 107. The front portions 113 are configured as guiding slots 113*a* for receiving corresponding portions (not shown) of the mating connector, so as to guide the electrical connector 1 to mate with the mating connector.

In some embodiments, the mating portion 205 of the conductive element 200 may extend into the base portion 101 of the insulative housing 100, or the intermediate portion 207 of the conductive element 200 may extend to the tongue portion 103 of the insulative housing 100. In some embodiments, there may be another portion(s) between the mating portion 205 and the intermediate portion 207 of the conductive element 200, or there may be another portion(s) between the mating portion 205 and the mating end 201 of the conductive element 200.

Nevertheless, it should be appreciated that the electrical connector may be made to have the following configuration to provide the benefits described above. In particular, the electrical connector includes an insulative housing and a plurality of conductive elements held by the insulative housing. For each of the plurality of conductive elements, the conductive element includes a thicker portion and a thinner portion extending from the thicker portion, the thinner portion is closer to the first end of the conductive element than the thicker portion, the conductive element is configured to establish an electrical contact with a mating conductive element of a mating connector at the thicker portion when the electrical connector is mated with the mating connector.

In one of these embodiments, the insulative housing includes a base portion elongated in a longitudinal direction, and a tongue portion extending from the base portion in a mating direction perpendicular to the longitudinal direction. At least a section of the thicker portion and the thinner portion are disposed on the tongue portion and oriented in the mating direction. For example, the thicker portion, the thinner portion and the first end are disposed on the tongue portion and oriented in the mating direction. It should be appreciated that the thicker portion and the thinner portion may have the same or similar configuration as the thicker portion 213 and the thinner portion 211 of the aforementioned mating portion 205, respectively.

In one of these embodiments, the conductive element establishes an electrical contact with the mating conductive element at the thicker portion adjacent to the joint between the thinner portion and the thicker portion. In one of these embodiments, for each of the plurality of conductive elements, the tongue portion supports the thicker portion of the conductive element and the thinner portion, and includes a void recessed into the tongue portion in the vertical direction below at least a portion of at least one of the thicker portion and the thinner portion. It should be appreciated that the void may be provided in a similar manner as described above in connection with the voids V1, V2, V3, and V4.

It should be appreciated that the first end may have the same or similar configuration as the mating end 201 described above. In one of these embodiments, the electrical connector is configured such that when the electrical connector is mated with the mating connector, the mating conductive element of the mating connector slides from the first end onto the conductive element and along the thinner portion onto the thicker portion. In one of these embodiments, the thinner portion may extend from the first end.

It should also be appreciated that providing the tongue portion 103 with the void recessed into the tongue portion 103 below at least a portion of the mating portion 205 in the vertical direction 109 may be used in combination with the configuration of the thinner and thicker portions of the mating portion 205, or may be used alone. Thus, it is contemplated that an electrical connector may be provided, the electrical connector comprising: an insulative housing comprising a base portion elongated in a longitudinal direction, and a tongue portion extending from the base portion along a mating direction perpendicular to the longitudinal direction; and a plurality of conductive elements held by the insulative housing, each conductive element comprising a mating portion disposed on the tongue portion; wherein the tongue portion includes a void recessed into the tongue portion in a vertical direction perpendicular to the longitudinal direction and the mating direction below at least a portion of the mating portion. This can reduce the impedance variation along the signal transmission path. In the illustrated example, similar to those described above, the tongue portion of the insulative housing of the electrical connector may include the same or similar configuration as the tongue portion 103 of the insulative housing 100 of the electrical connector 1 described above.

Although details of specific configurations of conductive elements and insulative housings are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several aspects of several embodiments, it is to be appreciated that various alterations, modifications, and improvements will readily occur to those skilled in the art. Such alterations, modifications, and improvements are intended to be part of this disclosure and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

For example, although some embodiments described herein are illustrated as a plug connector, it should be appreciated that the techniques described herein may be implemented in any suitable type of connectors. For example, techniques as described herein may be embodied in card edge connectors or connectors configured only for high-speed signals.

As another example, high-speed and low-speed signal conductors may be configured the same, with signal conductors in the same row having the same shape. The high-speed and low-speed signal conductors nonetheless may be differentiated based on the ground structures and insulative portions around them. Alternatively, some or all of the high-speed signal conductors may be configured differently from low-speed signal conductors, even within the same row. The edge-to-edge spacing may be closer for high-speed signal conductors, for example.

As another example, connectors are illustrated that have mating locations and mounting locations that may be compatible with a PCIeSAS standard. Techniques as described herein may be used to increase the operating speed of connectors designed according to other standards.

Furthermore, techniques for increasing the operating speed of a connector, even when constrained by dimensions specified in an industry standard, are shown and described with reference to a plug connector, it should be appreciated that aspects of the present disclosure are not limited in this regard, as any of the inventive concepts, whether alone or in combination with one or more other inventive concepts, may be used in other types of electrical connectors, such as receptacle connectors, card edge connectors, backplane connectors, right angle connectors, stacking connectors, mezzanine connectors, I/O connectors, chip sockets, etc.

In some embodiments, mounting ends were illustrated as surface mount elements that are designed to fit within pads of printed circuit boards. However, other configurations may also be used, such as press fit "eye of the needle" compliant sections, spring contacts, solderable pins, etc.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

All definitions, as defined and used, should be understood to control over dictionary definitions, definitions in documents incorporated by reference, and/or ordinary meanings of the defined terms.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value.

In the claims, as well as in the specification above, all transitional phrases such as "comprising," "including," "carrying," "having," "containing," "involving," "holding," "composed of," and the like are to be understood to be open-ended, i.e., to mean including but not being limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

In the claims, as well as in the specification above, use of ordinal terms such as "first," "second," "third," etc. does not by itself connote any priority, precedence, or order of one element over another or the temporal order in which acts of a method are performed, but are used merely as labels to distinguish one element having a certain name from another element having a same name (but for use of the ordinal term) to distinguish the elements.

What is claimed is:

1. An electrical connector, comprising:

a housing comprising a tongue portion, the tongue portion comprising a plurality of voids; and a plurality of conductive elements held by the housing, each of the plurality of conductive elements comprising a thicker portion and a thinner portion, wherein, for each of the plurality of conductive elements:

the thinner portion is disposed adjacent a respective void of the plurality of voids of the tongue portion so as to reduce impedance variations along signal transmission paths;

the conductive element is configured to make contact with a mating component at the thicker portion; and the thinner portion is closer to a mating end of the conductive element than the thicker portion.

2. The electrical connector of claim 1, wherein:

the plurality of conductive elements are a first plurality of conductive elements; and the electrical connector comprises a second plurality of conductive elements each extending with a uniform thickness to a mating end of the conductive element.

3. The electrical connector of claim 1, wherein:

the housing comprises a base portion extending in a longitudinal direction and the tongue portion extending from the base portion in a mating direction perpendicular to the longitudinal direction; and for each of the plurality of conductive elements, the thinner portion is disposed on the tongue portion and has a thickness less than a thickness of the thicker portion in a vertical direction perpendicular to the longitudinal direction and the mating direction.

4. The electrical connector of claim 3, wherein:

the base portion of the housing comprises a plurality of channels each fixedly holding a respective conductive element of the plurality of conductive elements.

5. The electrical connector of claim 3, wherein, for each of the plurality of conductive elements:

the thicker portion comprises a portion disposed on the tongue portion of the housing; and the portion of the thicker portion disposed on the tongue portion of the housing has a length in the mating direction of at least 1.9 mm and less than 3.9 mm.

6. The electrical connector of claim 3, wherein:

the tongue portion of the housing comprises a plurality of platforms each having a raised surface;

the thinner portions of the plurality of conductive elements are at least partially disposed on the raised surfaces of respective platforms of the plurality of platforms;

the raised surface of each of the plurality of platforms comprises first and second portions separated by a first void;

the thinner portion of a respective conductive element is at least partially disposed on the first and second portions of the raise surface;

the raised surface of each of the plurality of platforms comprises a third portion separated from the first portion by a second void; and the thinner portion of a second respective conductive element is at least partially disposed on the first and third portions of the raised surface.

7. The electrical connector of claim 6, wherein:

the plurality of platforms are a first plurality of platforms;

the tongue portion of the housing comprises a second plurality of platforms each having a raised surface; and the thicker portions of the plurality of conductive elements are at least partially disposed on the raised surfaces of respective platforms of the second plurality of platforms.

8. The electrical connector of claim 3, wherein:

each of the conductive element is configured to wipe along a respective mating component with the thinner portion.

9. The electrical connector of claim 8, wherein:

the plurality of conductive elements are retained in the housing at their edges such that broadsides of the plurality of conductive elements are adjacent respective voids.

10. An electrical connector, comprising:

a housing;

a plurality of conductive elements held by the housing, each of the plurality of conductive elements comprising a mating portion, a mounting portion, and an intermediate portion joining the mating portion and the mounting portion; and a member disposed in the housing and comprising a conductive plate, the member comprising a plurality of openings extending therethrough, wherein, for each of the plurality of conductive elements:

the mating portion comprises a mating end, a thicker portion, and a thinner portion extending between the mating end and the thicker portion;

the at least a portion of the thinner portion is disposed above a respective opening of the plurality of openings of the member; and at least a portion of the thinner portion is thinner than the thicker portion in a vertical direction.

11. The electrical connector of claim 10, wherein, for each of the plurality of conductive elements:

the mating portion further comprises a surface slanting in the vertical direction and joining the at least a portion of the thinner portion.

12. The electrical connector of claim 11, wherein:

the housing comprises a base portion extending in a longitudinal direction and a tongue portion extending from the base portion in a mating direction perpendicular to the longitudinal direction; and the tongue portion of the housing comprises a plurality of voids each disposed behind the thinner portion of a respective conductive element of the plurality of conductive elements.

13. The electrical connector of claim 11, wherein, for each of the plurality of conductive elements:

the mating end comprises a surface slanting in the vertical direction.

14. The electrical connector of claim 10, wherein:

the member comprises lossy material selectively disposed on the conductive plate.

15. The electrical connector of claim 14, wherein:

the plurality of conductive elements comprise pairs of signal conductors and ground conductors disposed between adjacent pairs of signal conductors; and the member comprises portions protruding toward the ground conductors.

16. An electrical connector, comprising:

a housing comprising a base portion extending in a longitudinal direction, a tongue portion extending from the base portion in a mating direction perpendicular to the longitudinal direction; and a plurality of conductive elements each comprising a first portion held in the base portion of the housing, a second portion extending from the first portion and held on the tongue portion, and a third portion extending from the first portion and out of the base portion of the housing, wherein:

the tongue portion of the housing comprises a plurality of voids;

each of the plurality of conductive elements is retained by edges of the second portion of the conductive element over a respective void of the plurality of voids; and for each of the plurality of conductive elements, the second portion comprises:

a first subportion disposed over the respective void of the plurality of voids, and a second subportion thicker than the first subportion in a vertical direction perpendicular to the longitudinal direction and the mating direction.

17. The electrical connector of claim 16, wherein, for each of the plurality of conductive elements, the second portion is configured to wipe along a respective mating component.

18. The electrical connector of claim 16, wherein:

the tongue portion of the housing comprises a second plurality of voids disposed underneath respective conductive elements of the plurality of conductive elements.

19. The electrical connector of claim 16, wherein:

the tongue portion of the housing comprises a first plurality of platforms aligned in a first row and a second plurality of platforms aligned in a second row parallel to the first row;

the first plurality of platforms comprise the plurality of voids; and each of the second plurality of platforms is aligned with a respective platform of the first plurality of platforms in the mating direction such that at least a portion of the second subportion of the second portion of a respective conductive element is disposed on the respective platform of the second plurality of platforms.

20. The electrical connector of claim 19, wherein:

each of the first plurality of platforms comprises a first portion, a second portion separated from the first portion by a first void of the plurality of voids, and a third portion separated from the first portion by a second void of the plurality of voids; and for each of the first plurality of platforms, a pair of conductive elements of the plurality of conductive elements are retained by the edges of the second portions of the pair of conductive elements over the first void and the second void, respectively.

* * * * *